United States Patent
Yamakawa et al.

(10) Patent No.: US 11,150,380 B2
(45) Date of Patent: Oct. 19, 2021

(54) PREDICTION DEVICE RAINFALL AMOUNT PREDICTION METHOD, AND RECORDING MEDIUM, SLOPE COLLAPSE PREDICTION SYSTEM AND DANGEROUS WATER LEVEL PREDICTION SYSTEM

(71) Applicant: NEC Corporation, Tokyo (JP)

(72) Inventors: Yuya Yamakawa, Tokyo (JP); Katsuhiro Ochiai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 342 days.

(21) Appl. No.: 16/323,292

(22) PCT Filed: Aug. 23, 2017

(86) PCT No.: PCT/JP2017/030161
§ 371 (c)(1),
(2) Date: Feb. 5, 2019

(87) PCT Pub. No.: WO2018/043252
PCT Pub. Date: Mar. 8, 2018

(65) Prior Publication Data
US 2019/0170903 A1 Jun. 6, 2019

(30) Foreign Application Priority Data
Aug. 31, 2016 (JP) .............................. JP2016-168793

(51) Int. Cl.
*G01W 1/10* (2006.01)
*G16Z 99/00* (2019.01)
(Continued)

(52) U.S. Cl.
CPC ................ *G01W 1/10* (2013.01); *G01W 1/14* (2013.01); *G06N 7/00* (2013.01); *G16Z 99/00* (2019.02); *Y02A 10/40* (2018.01)

(58) Field of Classification Search
None
See application file for complete search history.

(56) References Cited

U.S. PATENT DOCUMENTS

| | | | |
|---|---|---|---|
| 2014/0156232 A1* | 6/2014 | Cordazzo | G01W 1/14 703/2 |
| 2014/0164306 A1 | 6/2014 | Datta et al. | |
| 2015/0006079 A1 | 1/2015 | Leblanc | |

FOREIGN PATENT DOCUMENTS

| | | |
|---|---|---|
| JP | S51-047450 A | 4/1976 |
| JP | H09-021884 A | 1/1997 |

(Continued)

OTHER PUBLICATIONS

International Search Report for PCT Application No. PCT/JP2017/030161, dated Nov. 21, 2017.

(Continued)

*Primary Examiner* — Roy Y Yi
(74) *Attorney, Agent, or Firm* — Sughrue Mion, PLLC

(57) ABSTRACT

A rainfall amount prediction device includes: a first prediction unit creating a first prediction pattern, and calculating a first total rainfall amount that is the total rainfall amount in the first period according to the first prediction pattern; a second prediction unit determining a second total rainfall amount that is the total rainfall amount in a second period by subtracting the first total rainfall amount from the entire total rainfall amount, and creating, under the limitations of the second total rainfall amount, and a pattern creation unit creating a plurality of rainfall prediction patterns for the entirety of the prediction period by combining, on a time axis, the first prediction pattern and the plurality of second prediction patterns.

7 Claims, 14 Drawing Sheets

(51) Int. Cl.
      *G01W 1/14*     (2006.01)
      *G06N 7/00*     (2006.01)

(56)         References Cited

FOREIGN PATENT DOCUMENTS

| | | |  |
|---|---|---|---|
| JP | H10-177076 A | 6/1998 | |
| JP | 2000-345604 A | 12/2000 | |
| JP | 3296386 B2 * | 6/2002 | ............. G01W 1/10 |
| JP | 2004-069478 A | 3/2004 | |
| JP | 2005-351866 A | 12/2005 | |
| JP | 2007-285773 A | 11/2007 | |
| JP | 2008-102115 A | 5/2008 | |
| JP | 2015-232537 A | 12/2015 | |

OTHER PUBLICATIONS

English translation of Written opinion for PCT Application No. PCT/JP2017/030161.
Japanese Office Action for JP Application No. 2018-537185 dated Mar. 23, 2021 with English Translation.

\* cited by examiner

PREDICTION DEVICE RAINFALL AMOUNT PREDICTION METHOD, AND RECORDING MEDIUM, SLOPE COLLAPSE PREDICTION SYSTEM AND DANGEROUS WATER LEVEL PREDICTION SYSTEM

This application is a National Stage Entry of PCT/JP2017/030161 filed on Aug. 23, 2017, which claims priority from Japanese Patent Application 2016-168793 filed on Aug. 31, 2016, the contents of all of which are incorporated herein by reference, in their entirety.

TECHNICAL FIELD

The present invention relates mainly to a rainfall amount prediction device, a rainfall amount prediction method, and a recording medium used for disaster prediction.

BACKGROUND ART

As a disaster prediction, there is known, for example, slope collapse prediction that predicts collapse of a slope including the slope of a mountain, filling or cutting. It is possible to take life-saving action by predicting a slope collapse, for example, urge residents in the vicinity of a slope to take refuge or restrict trespassing on an area near the slope.

One of the most important factors that determine the accuracy of a slope collapse prediction is a predicted amount of a rainfall on a slope (hereinafter the predicted amount of the rainfall may be referred to as a "rainfall prediction pattern" or "time-series rainfall prediction data"). For a slope collapse prediction, a soil moisture content of a target slope is predicted by a water flow simulation using a rainfall prediction pattern and a change time point of a slope safety factor, for example, a predicted slope collapse time point, is finally predicted from the predicted soil moisture content.

A rainfall prediction pattern is created, for example, by using a prediction model. Current prediction models used for rainfall prediction include a short-term prediction model such as Very Short-Range Forecasting of Precipitation (VSRF) or a long-term prediction model such as Mesoscale Spectral Model (MSM) or Regional Spectral Model (RSM).

PTL 1 describes a rainfall amount prediction device for predicting a future rainfall amount from intensity distributions in the past and at present, a predicted moving speed and a predicted characteristic amount of rainfall. PTL 2 describes a technique for performing a rainfall prediction on the basis of a very short-term rainfall prediction using a meteorological radar every 10 to 30 minutes up to three hours ahead, and subsequently, every hour on the basis of a numerical calculation model up to 24 hours ahead. PTL 3 describes a technique for capturing and storing meteorological prediction data calculated by using a meteorological prediction model and meteorological observation data regularly provided from an external meteorological observation device such as Automated Meteorological Data Acquisition System (AMeDAS) of the Meteorological Agency.

CITATION LIST

Patent Literature

[PTL 1] Japanese Unexamined Patent Application Publication No. 10-177076
[PTL 2] Japanese Unexamined Patent Application Publication No. 2004-069478
[PTL 3] Japanese Unexamined Patent Application Publication No. 2008-102115

SUMMARY OF INVENTION

Technical Problem

A short-term prediction model has a drawback: the prediction accuracy of this model suddenly drops from a high accuracy maintained for one or two hours from the start of prediction. On the other hand, a long-term prediction model has a lower prediction accuracy than that of a short-term prediction model for one or two hours from the start of prediction but subsequently maintains a prediction accuracy at a certain level, unlike a sudden drop in the prediction accuracy of a short-term prediction model.

For disaster prediction, generally speaking, prediction over a long time interval, for example four to six hours, is required in consideration of evacuation of residents, prior notice to related organizations, or the like. In other words, a prediction using a long-term prediction model is required in addition to a prediction using only a short-term prediction model. For example, there may be used a rainfall prediction pattern in which a prediction result according to a short-term prediction model is employed for a first period of one or two hours and a prediction result according to a long-term prediction model is employed for the remaining period.

However, as mentioned above, while a long-term prediction model maintains an accuracy at a certain level but cannot perform a highly accurate prediction compared with a short-term prediction model. Further, as a disaster prediction, for example, a slope collapse prediction takes longer time, a long-term prediction model takes up higher percentage of a prediction period. This means that a prediction accuracy drops as a prediction period gets longer.

Moreover, from the beginning, influence of a disturbance, for example variations in a parameter during a simulation process, cannot be completely precluded even in the case of a short-term prediction model and there is no assurance that a precise prediction is performed at all times. That is to say, it is almost impossible to completely predict a rainfall with a current technique.

Nevertheless, prediction of a slope collapse, a flood disaster, or the like is an important prediction related to a human life. There is a high demand for a rainfall prediction pattern that offers a more precise disaster prediction. PTLs 1 through 3 propose a variety of techniques to offer a more precise rainfall prediction pattern. The tone itself of these techniques is correct.

In any case, only one rainfall prediction pattern is created. As mentioned above, it is difficult to completely predict a rainfall with any one of the current techniques. When a single rainfall prediction pattern in use is influenced by an unexpected disturbance, a prediction of a slope collapse or a flood disaster may fail. In particular, when a prediction is delayed, a human life could be threatened. Accordingly, such a prediction system is far from excellent robustness, that is, robustness to uncertain fluctuations or variations.

On the other hand, even when robustness is given the first priority, frequent erroneous reports (that is, a prediction like the boy who cried wolf) would render the prediction itself completely untrustworthy and spoil the reliability of a disaster prediction device.

The invention has been developed in order to solve the above problems. An object of the invention is to provide a rainfall amount prediction device, a rainfall amount prediction method, and a recording medium capable of prediction with excellent robustness (in other words, safety-first prediction based on an assumption that the prediction may fail) while maintaining the prediction accuracy for the entirety of a prediction period at a certain level.

Solution to Problem

The rainfall amount prediction device according to the invention includes: a first prediction means for, in relation to a first period within a prediction period, performing a rainfall prediction according to a first prediction model capable of prediction at a first accuracy, creating a first prediction pattern, and calculating a first total rainfall amount that is the total rainfall amount in the first period according to the first prediction pattern; a second prediction means for, in relation to the entirety of the prediction period, performing a rainfall prediction according to a second prediction model capable of prediction at a second accuracy lower than the first accuracy, creating a prediction pattern, determining an entire total rainfall amount that is the total rainfall amount in the entirety of the prediction period according to the prediction pattern, determining a second total rainfall amount that is the total rainfall amount in a second period that is a period in the prediction period other than the first period by subtracting the first total rainfall amount from the entire total rainfall amount, and creating, under the limitations of the second total rainfall amount, a plurality of second prediction patterns that are prediction patterns for the second period and that involve different patterns of rainfall; and a pattern creation means for creating a plurality of rainfall prediction patterns for the entirety of the prediction period by combining, on a time axis, the first prediction pattern and the plurality of second prediction patterns.

The rainfall amount prediction method according to the invention includes: in relation to a first period within a prediction period, performing a rainfall prediction according to a first prediction model capable of prediction at a first accuracy, creating a first prediction pattern, and calculating a first total rainfall amount that is the total rainfall amount in the first period according to the first prediction pattern; in relation to the entirety of the prediction period, performing a rainfall prediction according to a second prediction model capable of prediction at a second accuracy lower than the first accuracy, creating a prediction pattern, determining an entire total rainfall amount that is the total rainfall amount in the entirety of the prediction period according to the prediction pattern, determining a second total rainfall amount that is the total rainfall amount in a second period that is a period in the prediction period other than the first period by subtracting the first total rainfall amount from the entire total rainfall amount, and creating, under the limitations of the second total rainfall amount, a plurality of second prediction patterns that are prediction patterns for the second period and that involve different patterns of rainfall; and creating a plurality of rainfall prediction patterns for the entirety of the prediction period by combining, on a time axis, the first prediction pattern and the plurality of second prediction patterns.

The recording medium according to the invention is a recording medium for storing a program used to cause a computer to execute: a first prediction process to, in relation to a first period within a prediction period, perform a rainfall prediction according to a first prediction model capable of prediction at a first accuracy, create a first prediction pattern, and calculate a first total rainfall amount that is the total rainfall amount in the first period according to the first prediction pattern; a second prediction process to, in relation to the entirety of the prediction period, perform a rainfall prediction according to a second prediction model capable of prediction at a second accuracy lower than the first accuracy, create a prediction pattern, determine an entire total rainfall amount that is the total rainfall amount in the entirety of the prediction period according to the prediction pattern, determine a second total rainfall amount that is the total rainfall amount in a second period that is a period in the prediction period other than the first period by subtracting the first total rainfall amount from the entire total rainfall amount, and create, under the limitations of the second total rainfall amount, a plurality of second prediction patterns that are prediction patterns for the second period and that involve different patterns of rainfall; and a pattern creation process to create a plurality of rainfall prediction patterns for the entirety of the prediction period by combining, on a time axis, the first prediction pattern and the plurality of second prediction patterns.

Advantageous Effects of Invention

The invention makes it possible to perform a prediction with excellent robustness, or safety-first prediction based on an assumption that the prediction may fail, while maintaining the prediction accuracy for the entirety of a prediction period at a certain level.

EXAMPLE EMBODIMENT

First Example Embodiment

Description of Configuration

Figure 1:
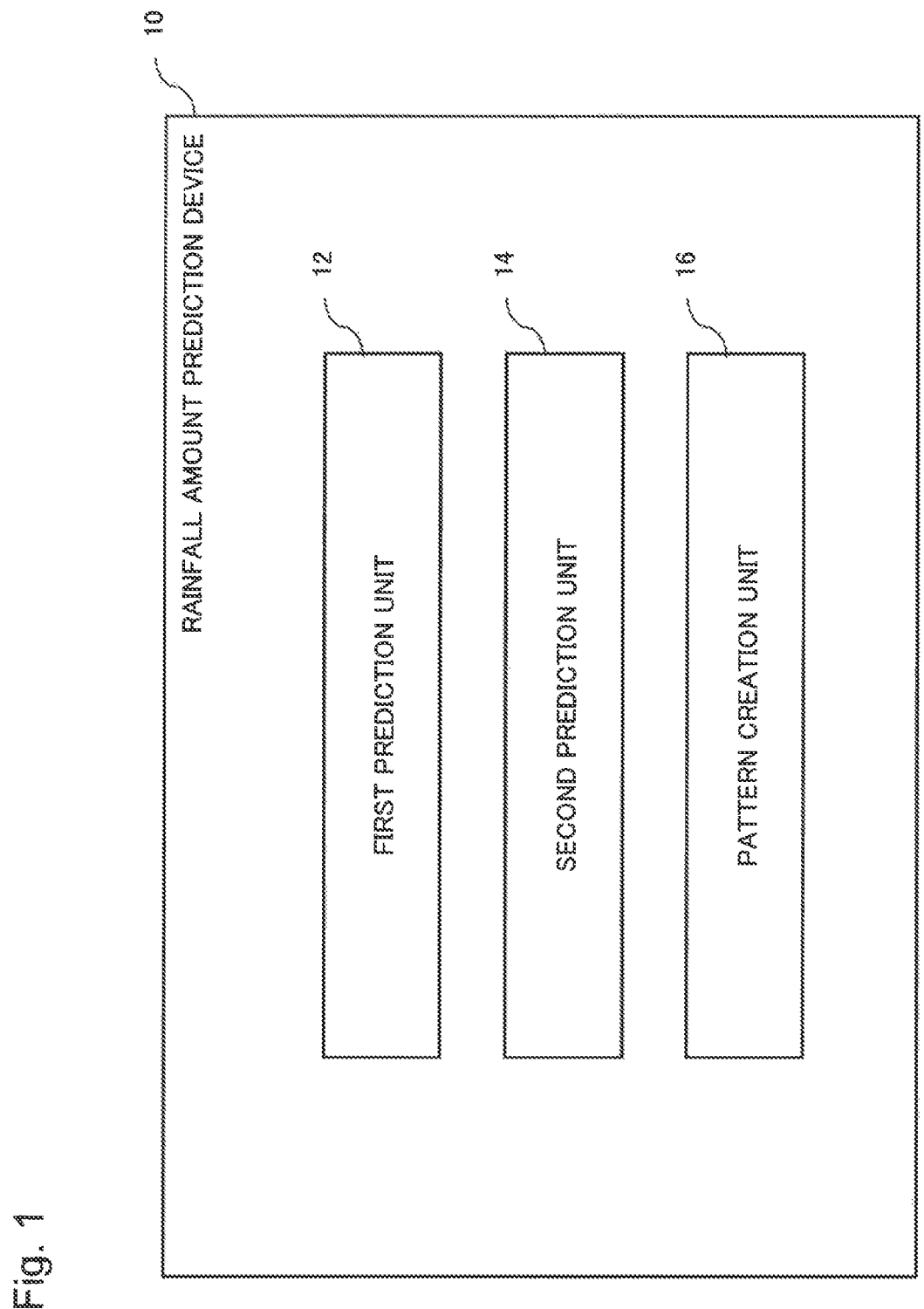
FIG. 1 is a block diagram of an example configuration of a rainfall amount prediction device according to a first example embodiment of the invention.

FIG. 1 is a block diagram of an example configuration of a rainfall amount prediction device 10 according to a first example embodiment of the invention. The rainfall amount prediction device 10 includes a first prediction unit 12 (an example of a "first prediction means"), a second prediction unit 14 (an example of a "second prediction means"), and a pattern creation unit 16 (an example of a "pattern creation means").

The first prediction unit 12, in relation to a first period (for example, from the start of prediction to two hours later) in a prediction period (for example, from the current time point to 10 hours later), performs a rainfall prediction according to a first prediction model capable of prediction at a first accuracy and creates a first prediction pattern. The first prediction unit 12 further calculates a first total rainfall amount that is the total rainfall amount in the first period according to the first prediction pattern.

The second prediction unit 14, in relation to the entirety of the prediction period, performs a rainfall prediction according to a second prediction model capable of prediction at a second accuracy lower than the first accuracy and creates a prediction pattern. The second prediction unit 14 determines an entire total rainfall amount that is the total rainfall amount in the entirety of the prediction period according to the prediction pattern and determines a second total rainfall amount that is the total rainfall amount in a second period that is a period in the prediction period other than the first period (for example, from two hours later to 10 hours later) by subtracting the first total rainfall amount from the entire total rainfall amount. The second prediction unit 14 creates, under the limitations of the second total rainfall amount, a plurality of second prediction patterns that are prediction patterns for the second period and that involve different patterns of rainfall.

The pattern creation unit 16 creates a plurality of rainfall prediction patterns for the entirety of the prediction period by combining, on a time axis, the first prediction pattern and the plurality of second prediction patterns.

Description of Operation

Figure 2:
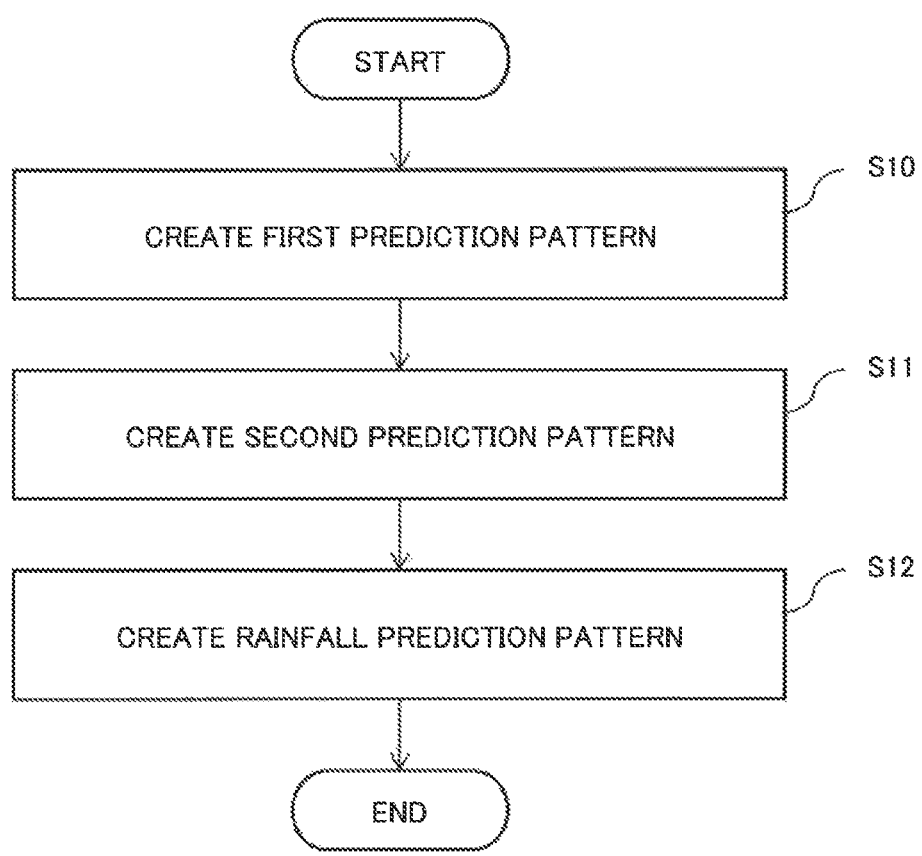
FIG. 2 is a flowchart illustrating an example operation of the rainfall amount prediction device according to the first example embodiment.

FIG. 2 is a flowchart illustrating an example operation (an example of a "rainfall amount prediction method") of the rainfall amount prediction device 10 shown in FIG. 1. The first prediction unit 12, in relation to a first period within a prediction period, performs a rainfall prediction according to a first prediction model capable of prediction at a first accuracy and creates a first prediction pattern (step S10/an example of a "first prediction process"). The first prediction unit 12 further calculates a first total rainfall amount that is the total rainfall amount in the first period according to the first prediction pattern.

The second prediction unit 14, in relation to the entirety of the prediction period, performs a rainfall prediction according to a second prediction model capable of prediction at a second accuracy lower than the first accuracy and creates a prediction pattern. The second prediction unit 14 determines an entire total rainfall amount that is the total rainfall amount in the entirety of the prediction period according to the prediction pattern and determines a second total rainfall amount that is the total rainfall amount in a second period that is a period in the prediction period other than the first period by subtracting the first total rainfall amount from the entire total rainfall amount. The second prediction unit 14 creates, under the limitations of the second total rainfall amount, a plurality of second prediction patterns that are prediction patterns for the second period and that involve different patterns of rainfall (step S11/an example of a "second prediction process").

The pattern creation unit 16 creates a plurality of rainfall prediction patterns for the entirety of the prediction period by combining, on a time axis, the first prediction pattern and the plurality of second prediction patterns (step S12/an example of a "pattern creation process").

Description of Advantageous Effects

In the first example embodiment described above, a plurality of rainfall prediction patterns are created. This makes it possible to report each disaster prediction performed on the basis of a plurality of rainfall prediction patterns, for example, in the case of a slope collapse, a predicted time point at which the slope collapse will occur earliest among all predicted time points of the slope collapse for each rainfall prediction pattern. In other words, the first example embodiment makes it possible to perform a prediction with excellent robustness.

Further, in the first example embodiment, the second prediction pattern of the plurality of rainfall prediction patterns is created under the limitations of the second total rainfall amount (that is, the total rainfall amount in the second period according to the second prediction model). In this example, generally speaking, it is considered that the reliability of a predicted total rainfall amount over a long time interval according to the second prediction model (for example, a long-term prediction model) is relatively high. In other words, the prediction accuracy for the entirety of a prediction period according to each rainfall prediction pattern is maintained at a certain level.

Summarizing the above, the first example embodiment makes it possible to perform a prediction with excellent robustness while maintaining the prediction accuracy for the entirety of a prediction period at a certain level.

Description of a Rainfall Prediction Pattern Creation Example

Figure 3:
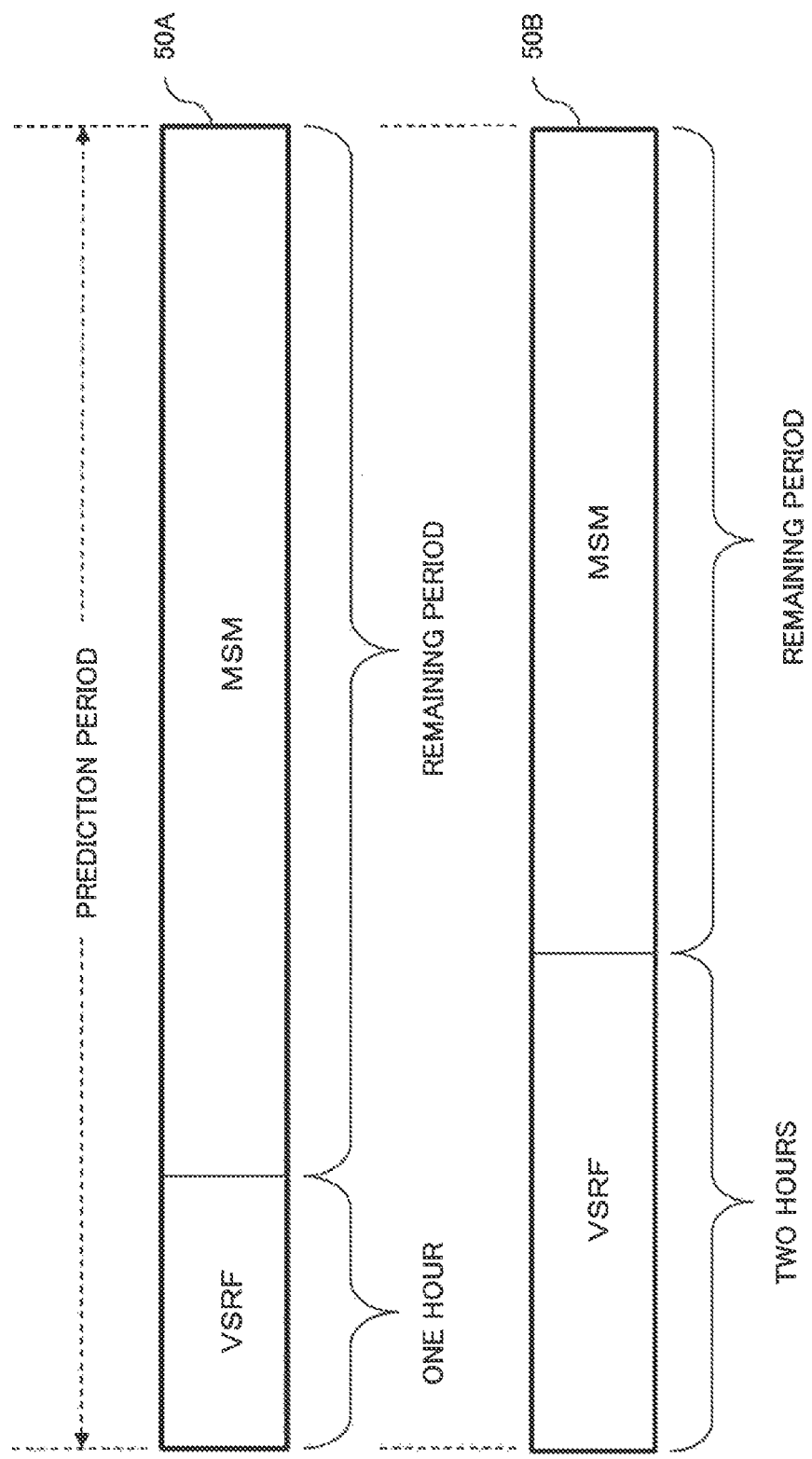
FIG. 3 illustrates a first creation example of a plurality of rainfall prediction patterns in the first example embodiment.

FIG. 3 illustrates a first creation example of a plurality of rainfall prediction patterns in the first example embodiment. FIG. 3 illustrates two rainfall prediction patterns 50A, 50B. A first prediction model and a second prediction model are common between the rainfall prediction patterns 50A and 50B. FIG. 3 illustrates an example in which the first prediction model is VSRF and the second prediction model is MSM. The rainfall prediction pattern 50A differs from the rainfall prediction pattern 50B in respect of the length of a first period and a second period.

VSRF is a model that performs a rainfall prediction by temporally interpolating a rainfall amount analyzed by the radar AMeDAS, which amount represents on-the-spot rainfall distribution in consideration of a wind direction and velocity, effects of development and weakening of rainfall by land features, and the result of a numerical forecast. AMeDAS is an abbreviation of Automated Meteorological Data Acquisition System that is a meteorological observation system operated by the Japan Meteorological Agency. Generally speaking, it is considered that VSRF has a high prediction accuracy over a short time interval such as one to two hours but a substantially lower accuracy afterwards.

MSM is a non-hydrostatic model that assumes an equilibrium between a vertical pressure gradient force and a specific gravity and employs a data assimilation function using various types of meteorological observation information. In general, it is considered that MSM has a slightly lower prediction accuracy over a short time interval than VSRF but is unlikely to exhibit a large drop in prediction accuracy over a long time interval. The analysis domain of MSM is, for example, Japan and its costal waters.

In this example, the first prediction unit 12 creates two first prediction patterns in which the first period differs in length (a pattern in which VSRF is used for one hour and another in which VSRF is used for two hours) by using a single type of a first prediction model (VSRF). The second prediction unit 14 creates, by using a single type of a second prediction model (MSM), two second prediction patterns having a different length from each other (patterns in which the period other than the first period corresponds to MSM). The pattern creation unit 16 creates a plurality of rainfall prediction patterns 50A, 50B by respectively combining, on a time axis, the two first prediction patterns having a different length from each other and the two second prediction patterns having a different length from each other.

In this way, it is possible to create a plurality of rainfall prediction patterns by changing the length of a first period and a second period. While two rainfall prediction patterns are illustrated in FIG. 3, three or more rainfall prediction patterns may be created. The length of the first period and the second period is not limited to the above example. The type of the first prediction model and the second prediction model is not limited to the above example.

Figure 4:
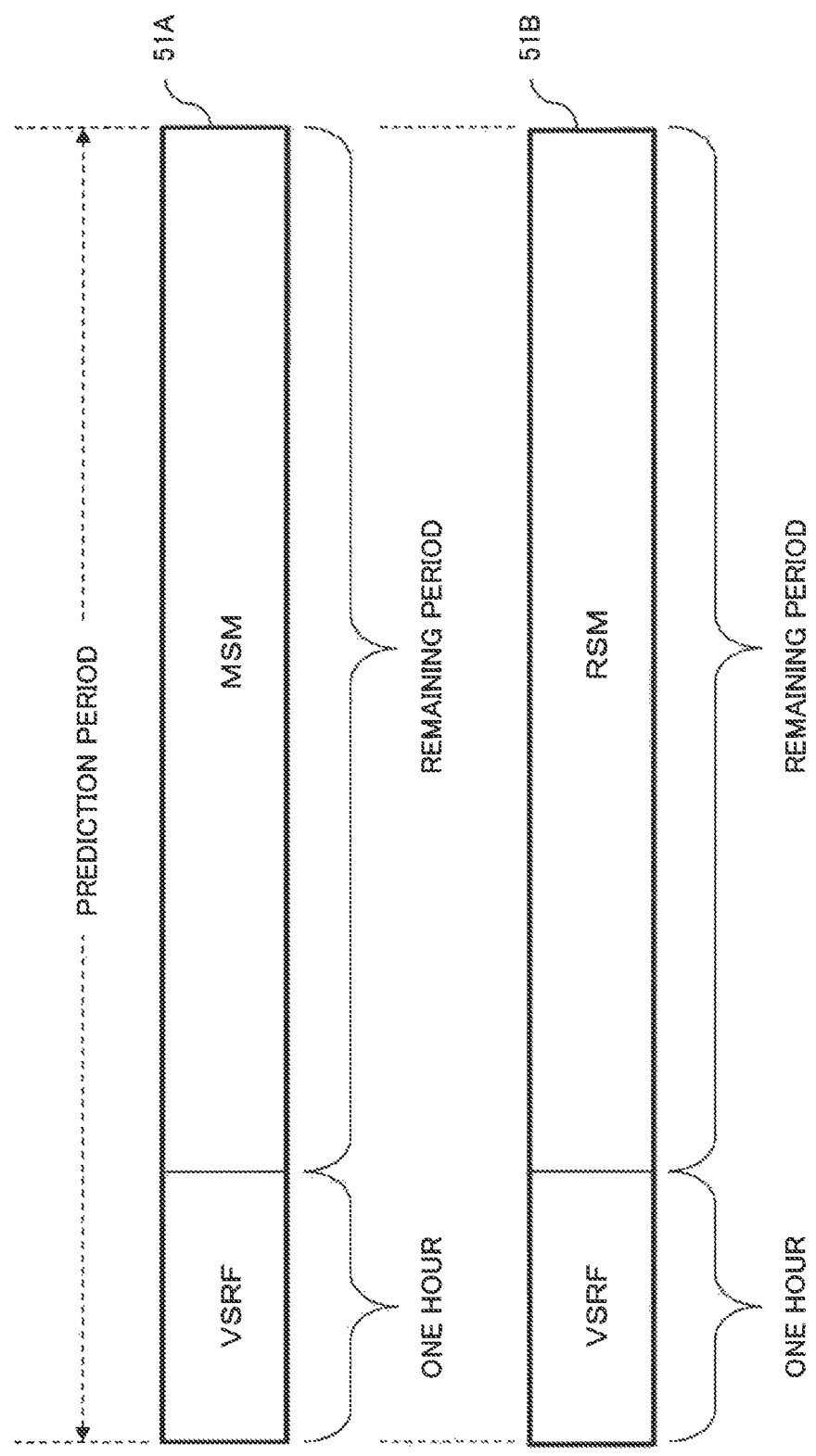
FIG. 4 illustrates a second creation example of the plurality of rainfall prediction patterns in the first example embodiment.

FIG. 4 illustrates a second creation example of the plurality of rainfall prediction patterns in the first example embodiment. FIG. 4 illustrates two rainfall prediction patterns 51A, 51B. The type of the first prediction model (VSRF) and the length of the first period and the second period are common between the rainfall prediction patterns 51A, 51B. The rainfall prediction pattern 51A differs from the rainfall prediction pattern 51B in that the type of the second prediction model is different (MSM or RSM).

Note that RSM is based on a similar physical model to MSM. Prediction accuracy of RSM is almost equivalent to that of MSM. The analysis domain of RSM is, for example, Japan and other East Asian countries.

In this example, the first prediction unit 12 creates a first prediction pattern (a pattern in which VSRF is used for one hour) by using the first prediction model (VSRF). The second prediction unit 14 creates a plurality of second prediction patterns (an MSM pattern and an RSM pattern) by using a plurality of second prediction models of different types (MSM and RSM). The pattern creation unit 16 creates a plurality of rainfall prediction patterns 51A, 51B by combining, on a time axis, the first prediction pattern and the plurality of second prediction patterns.

In this way, it is possible to create a plurality of rainfall prediction patterns by changing the type of the second prediction model. While two rainfall prediction patterns are illustrated in FIG. 4, three or more rainfall prediction patterns may be created. The length of the first period is not limited to the above example. The type of the first prediction model and the second prediction model is not limited to the above example.

A plurality of rainfall prediction patterns may be created by changing the type of the first prediction model while fixing the type of the second prediction model.

Second Example Embodiment

Figure 5:
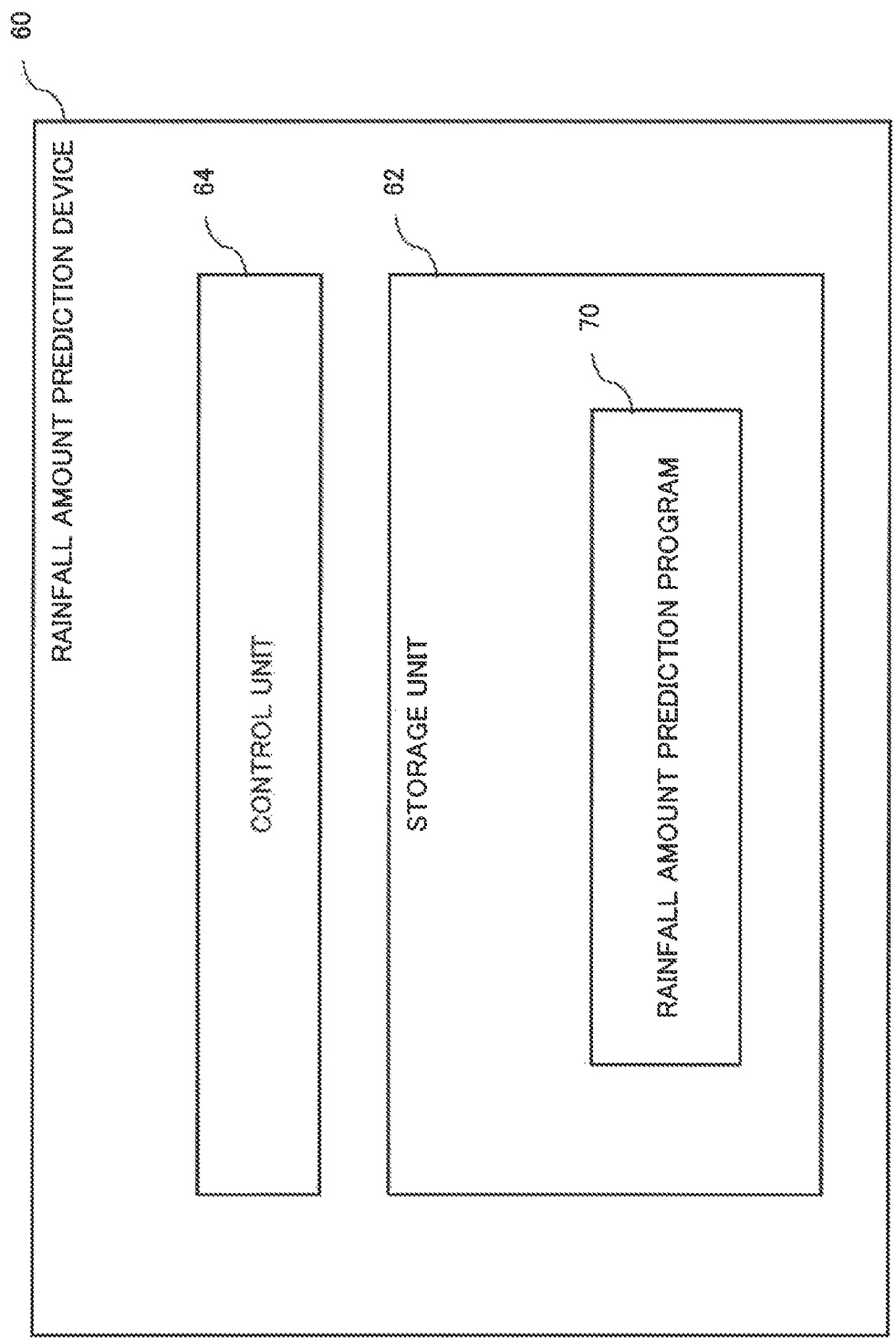
FIG. 5 is a block diagram of an example configuration of a rainfall amount prediction device according to a second example embodiment of the invention.

FIG. 5 is a block diagram of an example configuration of a rainfall amount prediction device 60 according to a second example embodiment of the invention. The rainfall amount prediction device 60 includes a storage unit 62 and a control unit 64. The storage unit 62 is a computer-readable recording medium and stores a rainfall amount prediction program 70. The rainfall amount prediction program 70 is a program used to cause the control unit 64 to execute the process illustrated in FIG. 2. The control unit 64 executes the rainfall amount prediction program 70.

The aforementioned second example embodiment makes it possible to perform a prediction with excellent robustness while maintaining the prediction accuracy for the entirety of a prediction period at a certain level, in a similar way to the first example embodiment.

An example of the control unit 64 is a Central Processing Unit (CPU). The computer-readable recording medium is, for example, a non-transitory storage device. Examples of a non-transitory storage device include a portable medium such as a magneto-optical disk, a Read Only Memory (ROM) or a nonvolatile semiconductor memory, and a hard disk built into a computer system. The computer-readable recording medium may be a transitory storage device. Examples of a transitory storage device include a communication line used to transmit a program via a network such as the Internet or a communication link such as a telephone line, and a volatile memory inside a computer system.

Third Example Embodiment

Description of Configuration

Figure 6:
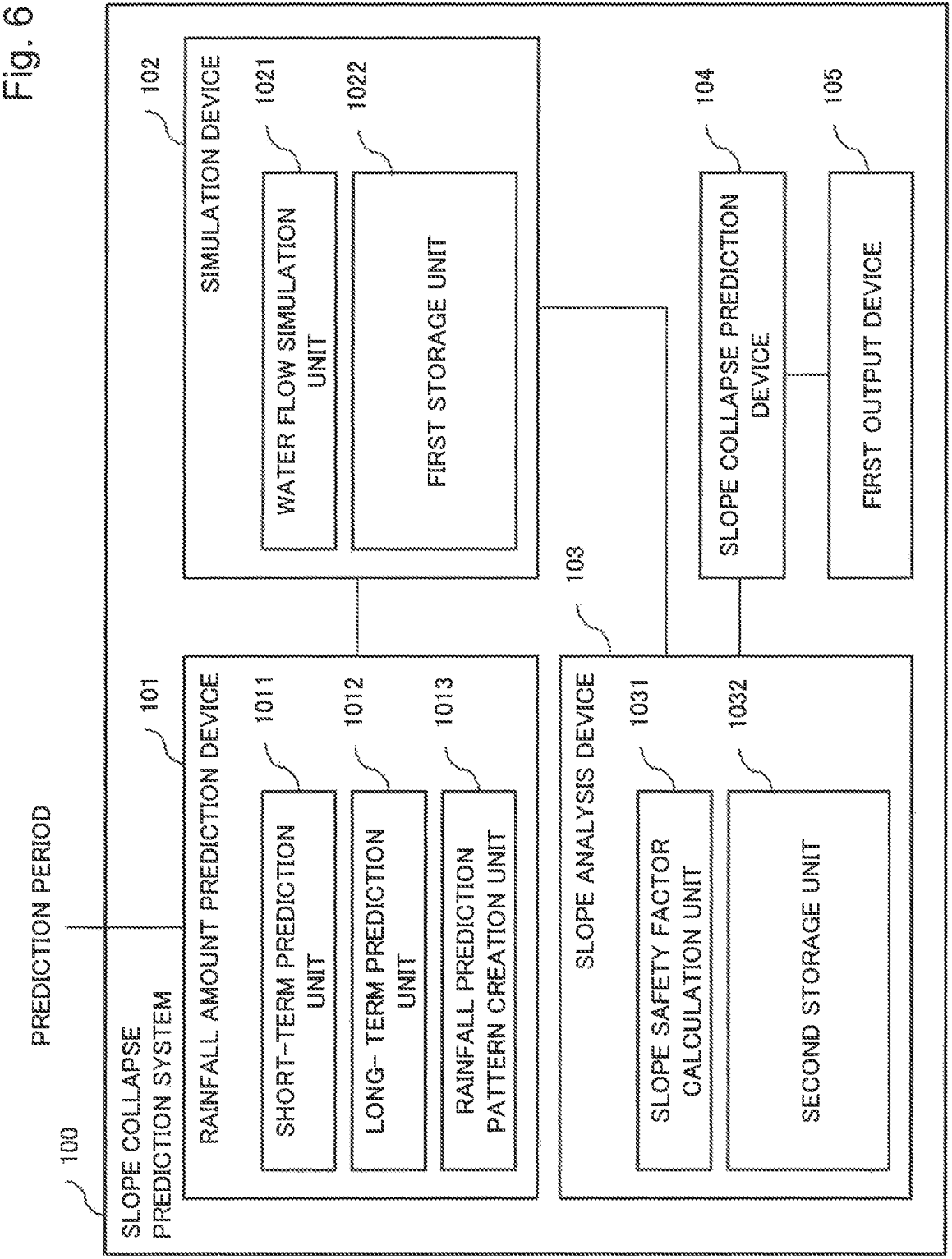
FIG. 6 is a block diagram of an example configuration of a slope collapse prediction system according to a third example embodiment of the invention.

FIG. 6 is a block diagram of an example configuration of a slope collapse prediction system 100 according to a third example embodiment of the invention.

The slope collapse prediction system 100 outputs a predicted time point of a slope collapse (a predicted collapse time point described later) anticipated for a prediction target slope within a prediction period specified by a person who performs a prediction of a slope collapse, for example a period from a prediction start time point to a prediction end time point. The slope collapse prediction system 100 includes a rainfall amount prediction device 101, a simulation device 102, a slope analysis device 103, a slope collapse prediction device 104, and a first output device 105.

The rainfall amount prediction device 101 includes a short-term prediction unit 1011, a long-term prediction unit 1012, and a rainfall prediction pattern creation unit 1013. Note that the short-term prediction unit 1011 is an example of the first prediction unit 12 in the first example embodiment and that the long-term prediction unit 1012 is an example of the second prediction unit 14 in the first example embodiment.

The short-term prediction unit 1011 predicts, according to a prediction model, a rainfall in a time interval from a prediction start time point in which time interval a high-accuracy prediction is available (hereinafter referred to as a "short-term prediction period" which corresponds to an example of the "first period" in the first example embodiment) and creates a short-term prediction pattern corresponding to an example of the "first prediction pattern" in the first example embodiment. The prediction model for the short-term prediction period is a model capable of prediction over a short time interval at a high accuracy, for example, VSRF. While this example embodiment illustrates a case in which the short-term prediction unit 1011 outputs a single short-term prediction pattern, the short-term prediction unit 1011 may output a plurality of short-term prediction patterns. The short-term prediction unit 1011 calculates a total rainfall amount according to the short-term prediction pattern (an example of the "first total rainfall amount" in the first example embodiment).

The long-term prediction unit 1012 predicts, according to a prediction model, a rainfall in a time interval within the prediction period in which the short-term prediction unit 1011 does not perform a prediction (hereinafter referred to as a "long-term prediction period" which corresponds to an example of the "second period" in the first example embodiment) and obtains a long-term rainfall prediction result. The prediction model for a long-term prediction period is a model capable of prediction over a long time interval at a stable accuracy, for example, MSM or RSM. The long-term prediction unit 1012 calculates a predicted total rainfall amount in the long-term prediction period (an example of the "second total rainfall amount" in the first example embodiment) by using the total rainfall amount according to the short-term prediction pattern and the long-term rainfall prediction result. The long-term prediction unit 1012 then creates a plurality of long-term prediction patterns in the long-term prediction period (an example of the "second prediction pattern" in the first example embodiment) under the limitations of the predicted total rainfall amount that has been calculated.

The aforementioned "limitations of the predicted total rainfall amount" will be described. As mentioned above, the prediction accuracy of a long-term prediction model over a short time interval, that is, the reliability of a predicted instantaneous rainfall amount, is not very high. However, the reliability a predicted total rainfall amount over a long time interval according to a long-term prediction model is high. Accordingly, this example embodiment creates a plurality of long-term prediction patterns in a long-term prediction period while keeping constant the reliable predicted total rainfall amount. In other words, the "limitations of the predicted total rainfall amount" in this example embodiment translates into keeping constant the predicted total rainfall amount. Note that keeping constant the predicted total rainfall amount is only exemplary and the limitations of the predicted total rainfall amount are not limited thereto.

The rainfall prediction pattern creation unit 1013 creates a plurality of rainfall prediction patterns for the entirety of a prediction period (time-series data of rainfall prediction) by combining, on a time axis, a short-term prediction pattern (a single short-term prediction pattern in this example embodiment) created by the short-term prediction unit 1011 and a long-term prediction pattern (a plurality of long-term prediction patterns in this example embodiment) created by the long-term prediction unit 1012.

A process will be described in which a plurality of long-term prediction patterns are created under the limitations of the predicted total rainfall amount. In the following description, a case is envisioned in which a rainfall amount in a prediction period from the current time point to N hours later is predicted. It is assumed that the prediction period in this example is a longer time interval than a prediction time interval (for example, two hours) according to a short-term prediction model (for example, VSRF). In other words, the prediction period in this example is a time interval that necessarily includes a prediction period according to a long-term prediction model.

Figure 7:
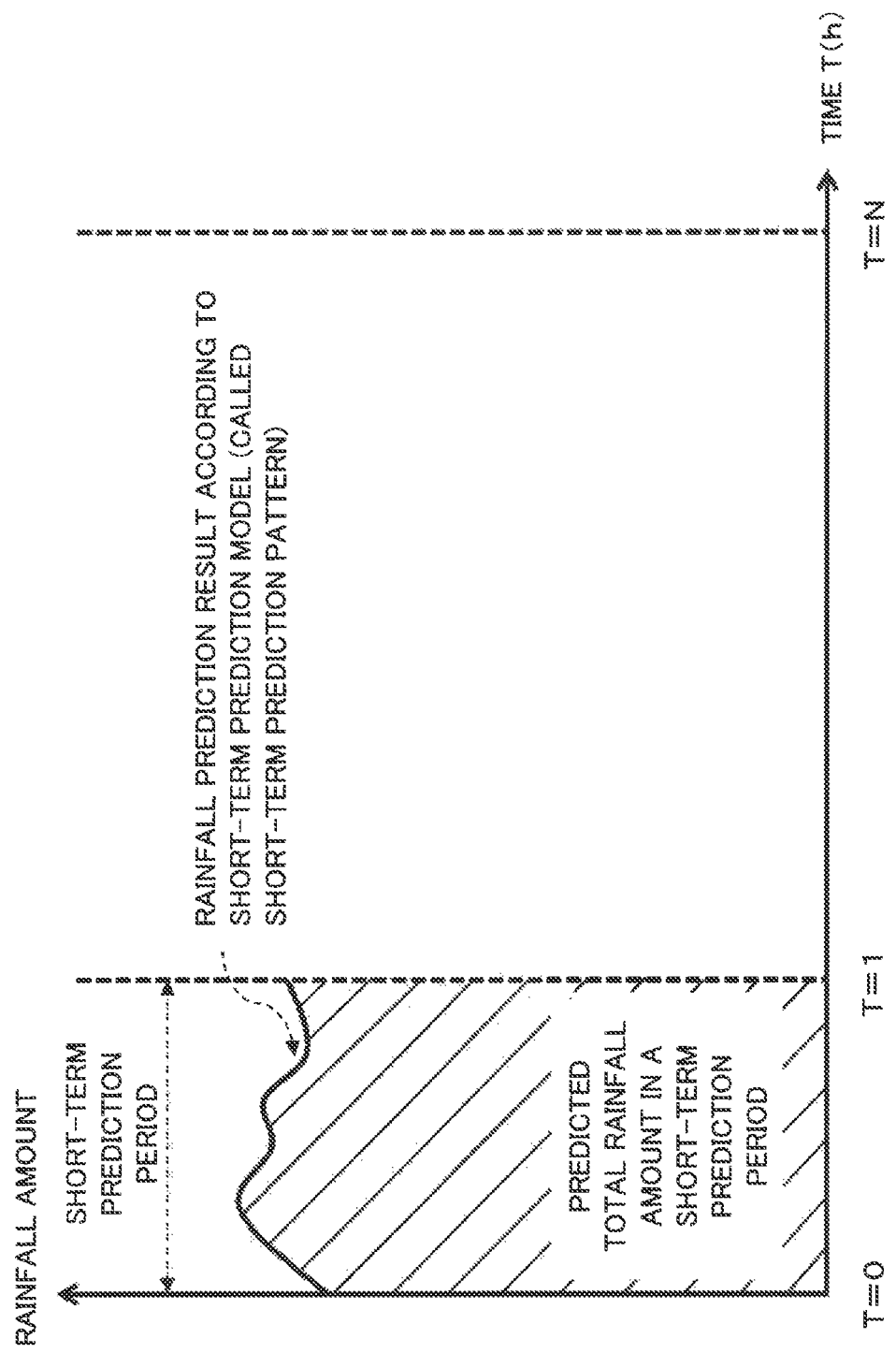
FIG. 7 illustrates a rainfall prediction result according to a short-term prediction model in the third example embodiment.

FIG. 7 illustrates a rainfall prediction result according to a short-term prediction model (for example, VSRF) in the third example embodiment. In FIG. 7, the rainfall prediction result according to the short-term prediction model, that is, the short-term prediction pattern created by the short-term prediction unit 1011) is illustrated with random waves in a solid line between a time point T=0 and a time point T=1. The area of the range enclosed with hatch lines in FIG. 7 indicates the predicted total rainfall amount in the short-term prediction period.

Figure 8:
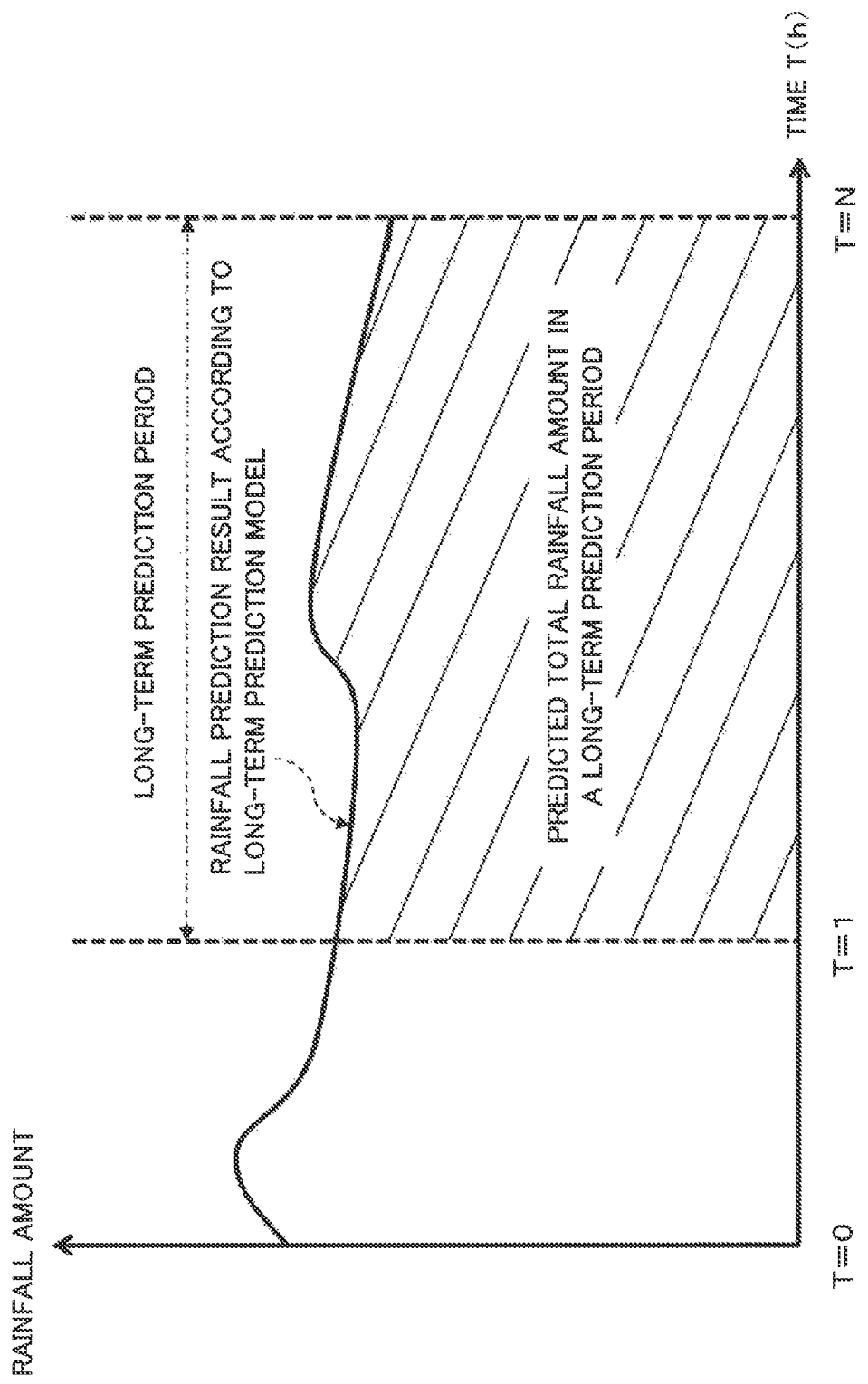
FIG. 8 illustrates a rainfall prediction result according to a long-term prediction model in the third example embodiment.

FIG. 8 illustrates a rainfall prediction result according to a long-term prediction model (for example, MSM or RSM) in the third example embodiment. In FIG. 8, the rainfall prediction result according to the long-term prediction model is illustrated with random waves in a solid line between a time point T=0 and a time point T=N. The area of the range enclosed with hatch lines in FIG. 8 indicates the predicted total rainfall amount in the long-term prediction period. In this example, the predicted total rainfall amount in the long-term prediction period is obtained, for example, by precluding the area illustrated with hatch lines in FIG. 7 (the predicted total rainfall amount in the short-term prediction period) from the total area of the entire random waves in a solid line in FIG. 8 (the rainfall prediction result according to the long-term prediction model).

While the above example illustrates, by using FIGS. 7 and 8, a case in which a predicted total rainfall amount in a long-term prediction period is obtained by precluding an area from another area, this example does not limit the invention. In other words, a predicted total rainfall amount in a long-term prediction period is calculated by subtracting a total rainfall amount in a short-term prediction period obtained by a rainfall prediction according to a short-term prediction model from a total rainfall amount in the entirety of a prediction period obtained by a rainfall prediction according to a long-term prediction model.

The long-term prediction unit 1012 creates, under the limitations of the calculated predicted total rainfall amount in the long-term prediction period, a plurality of long-term prediction patterns in the long-term prediction period. In the following example case, three long-term prediction patterns are created.

Figure 9:
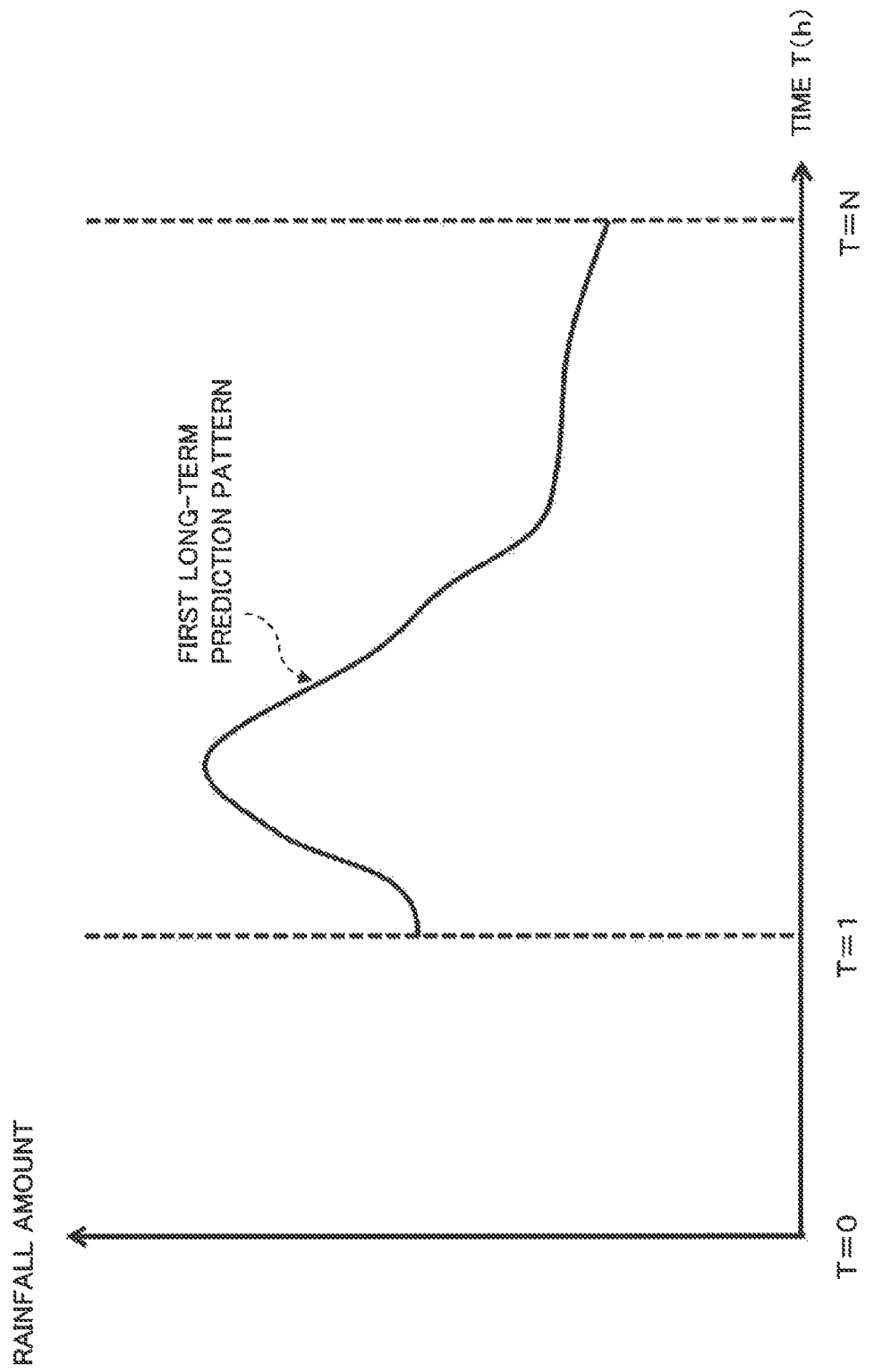
FIG. 9 illustrates a first long-term prediction pattern created in the third example embodiment.

FIG. 9 illustrates a first long-term prediction pattern. The first long-term prediction pattern is an early-stage-concentrated pattern assuming a case in which rainfall is concentrated on an early stage of a long-term prediction period.

Figure 10:
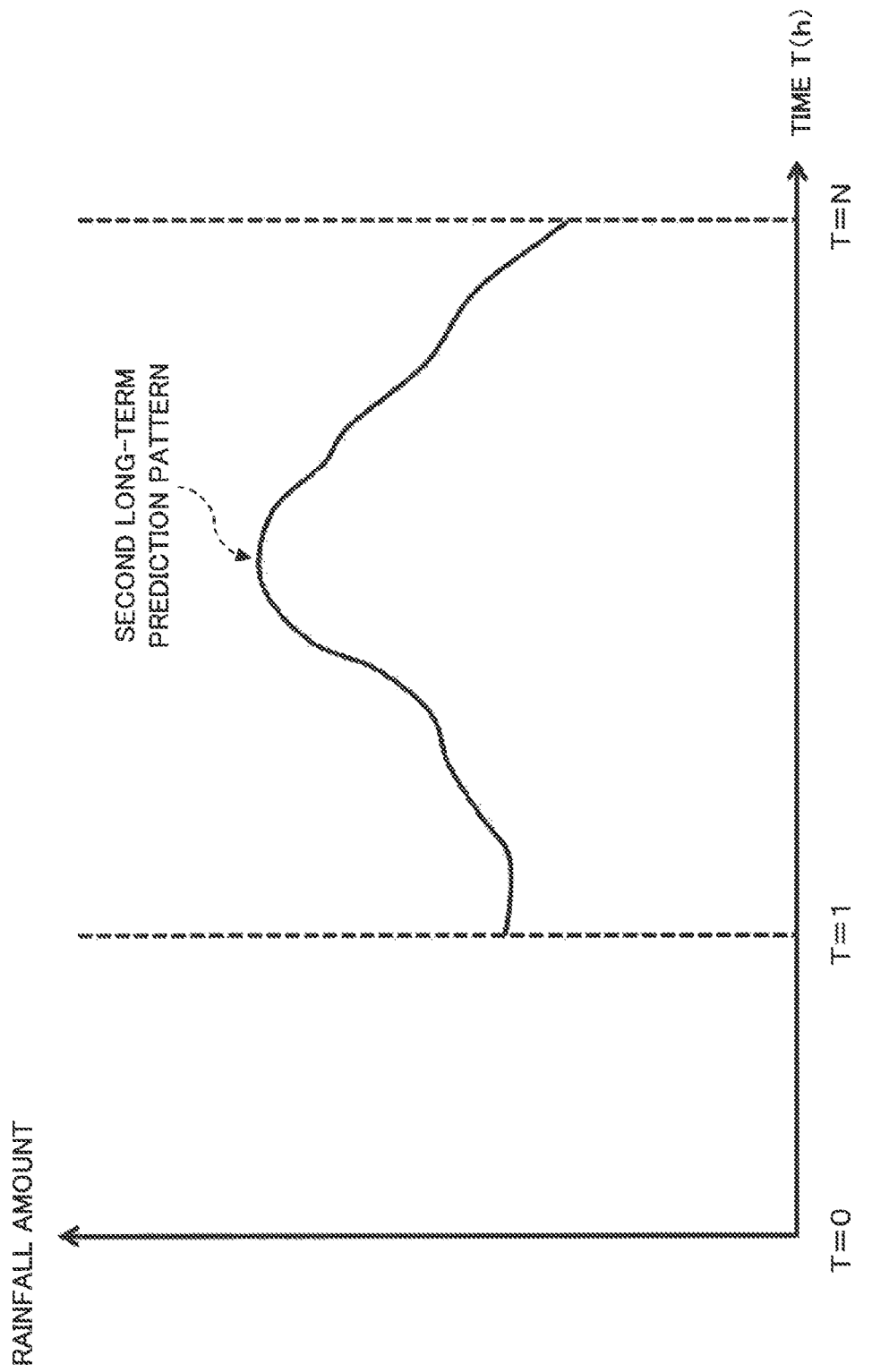
FIG. 10 illustrates a second long-term prediction pattern created in the third example embodiment.

FIG. 10 illustrates a second long-term prediction pattern. The second long-term prediction pattern is a middle-stage-concentrated pattern assuming a case in which rainfall is concentrated on a middle stage of a long-term prediction period.

Figure 11:
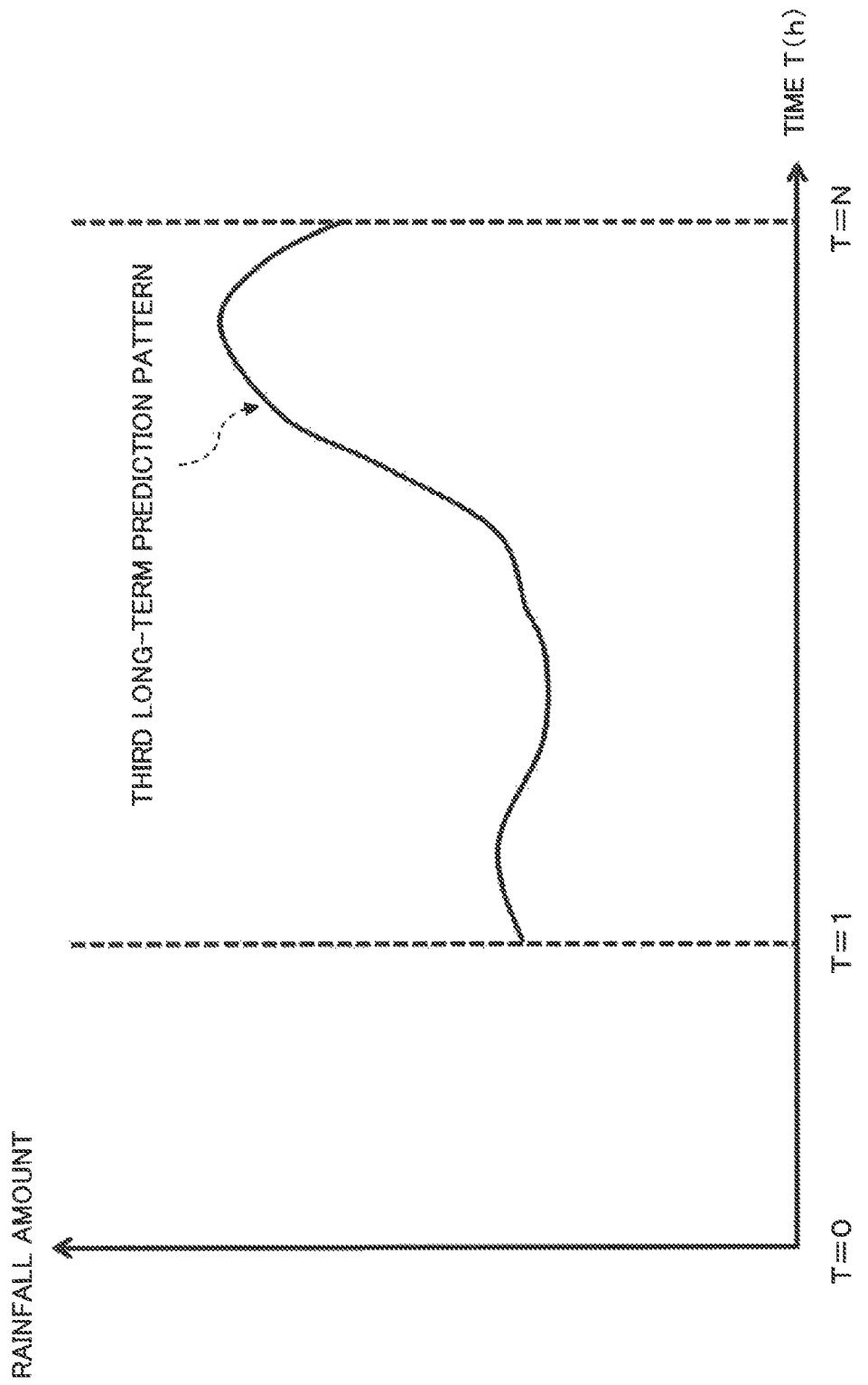
FIG. 11 illustrates a third long-term prediction pattern created in the third example embodiment.

FIG. 11 illustrates a third long-term prediction pattern. The third long-term prediction pattern is a late-stage-concentrated pattern assuming a case in which rainfall is concentrated on a late stage of a long-term prediction period.

In this example, the first long-term prediction pattern (FIG. 9), the second long-term prediction pattern (FIG. 10) and the third long-term prediction pattern (FIG. 11) correspond to the same predicted total rainfall amount. In other words, in this example, the plurality of long-term prediction patterns are created under the "limitations of the predicted total rainfall amount".

Note that the first long-term prediction pattern, the second long-term prediction pattern, and the third long-term prediction pattern may be determined by using any method satisfying a condition that a predicted total rainfall amount is constant. For example, these long-term prediction patterns may be determined by way of automatic calculation using a rainfall prediction result according to a long-term prediction model, or may be determined by way of a human system.

Any plural number of long-term prediction patterns may be determined, and the number is not limited to three unlike in the above example.

In this example, the rainfall prediction pattern creation unit 1013 creates a first rainfall prediction pattern by combining, on a time axis, the short-term prediction pattern created by the short-term prediction unit 1011 (FIG. 7) and the first long-term prediction pattern created by the long-term prediction unit 1012 (FIG. 9). The rainfall prediction pattern creation unit 1013 creates a second rainfall prediction pattern by combining, on a time axis, the short-term prediction pattern (FIG. 7) and the second long-term prediction pattern created by the long-term prediction unit 1012 (FIG. 10). The rainfall prediction pattern creation unit 1013 creates a third rainfall prediction pattern by combining, in a time axis, the short-term prediction pattern (FIG. 7) and the third long-term prediction pattern created by the long-term prediction unit 1012 (FIG. 11).

The following is a continuation of description of FIG. 6. The simulation device 102 includes a water flow simulation unit 1021 and a first storage unit 1022.

The water flow simulation unit 1021 performs a prediction of a soil moisture content by performing a water flow simulation based on a predetermined physical model for a wide first region including a prediction target slope, that is, an area as a target of water flow simulation in a slope collapse prediction, and creates time-series moisture content data. The time-series moisture content data is time-series data of a soil moisture content from a prediction start time point to a prediction end time point.

The term "physical model" used herein refers to a model in general with which it is possible to physically calculate a water flow in a target area of water simulation by using a rainfall prediction pattern as input data and calculate a water storage amount, a runoff amount, or the like.

A concrete example of a physical model is a distributed runoff model. The distributed runoff model is a model used to simulate a water flow in a first region by using as an input the rainfall prediction pattern for a target area of water flow simulation, for example, the first region in this example embodiment. Specifically, the first region is divided into meshes of an appropriate size (50 m×50 m, 250 m×250 m, or the like) in a water flow simulation using a distributed runoff model. In this example, any one of the meshes corresponds to a prediction target slope. The prediction target slope need not be composed of a single mesh but may be composed of a plurality of meshes. A water flow between meshes is determined in one direction by using a concept of a drainage line, based on gradient information representing the gradient of the first region.

When performing a water flow simulation according to a distributed runoff model, the water flow simulation unit 1021 calculates the soil moisture content of each mesh, runoff amount to a connected mesh, or the like by simulating a flow of water in a mesh on the basis of a rainfall prediction pattern. In other words, the water flow simulation unit 1021 performs a water flow simulation by using a rainfall prediction pattern and creates time-series moisture content data of a mesh corresponding to a prediction target slope.

As mentioned above, a plurality of rainfall prediction patterns are created in the rainfall amount prediction device 101. Accordingly, the water flow simulation unit 1021 performs a water flow simulation for each of the plurality of rainfall prediction patterns and creates time-series moisture content data of a mesh corresponding to a prediction target slope.

The first storage unit 1022 stores the time-series moisture content data. In this process, as many pieces of time-series moisture content data as the number of rainfall prediction patterns are stored.

The slope analysis device 103 includes a slope safety factor calculation unit 1031 and a second storage unit 1032.

The slope safety factor calculation unit 1031 creates time-series data of a slope safety factor (hereinafter referred to as "time-series safety factor data") for each of the plural pieces of time-series moisture content data stored in the first storage unit 1022. The slope safety factor is an index representing the safety of a prediction target slope and can be calculated by way of a slope stability analysis formula used in soil science or the like. Examples of a slope stability analysis formula include the Fellenius method, the modified Fellenius method, the Jambu method, and the Bishop method. Note that a slope stability analysis formula requires parameters such as an internal frictional angle, a pore-water pressure, a viscosity, and an earth mass weight of a soil constituting a slope. These parameters can be calculated from time-series moisture content data by achieving a relationship with a soil moisture content in advance. It is thus possible to create time-series safety factor data from time-series moisture content data. Time-series safety factor data is created for each piece of time-series moisture content data. In this example, time-series safety factor data is a representation of a slope safety factor for each time point in a positive real number and leads to a theoretical collapse, for example, when a slope factor is below 1 (a predetermined safety threshold).

The slope safety factor calculation unit 1031 extracts at least one time point at which a slope safety factor is below 1 (a reference non-attainment time point) for each piece of time-series safety factor data created by way of the above method, creates reference non-attainment time point data including data of all reference non-attainment time points that have been extracted, and stores the reference non-attainment time point data in the second storage unit 1032. In this process, reference non-attainment time point data is created for each piece of time-series safety factor data.

Note that reference non-attainment time point data itself need not be created when no reference non-attainment time points exist (that is, when no slope safety factors below 1 exist), or may be created only with a status specified indicating "no reference non-attainment time points (No Data)".

The slope collapse prediction device 104 checks all pieces of reference non-attainment time point data stored in the second storage unit 1032 of the slope analysis device 103 and determines, as a predicted collapse time point of a prediction target slope, a time point at which a slope safety factor is below a safety threshold earliest among all the pieces of data. Note that a predicted collapse time point need not be created when no reference non-attainment time points exist. When only a single reference non-attainment time point exists, the slope collapse prediction device 104 may determine the reference non-attainment time point as a predicted collapse time point.

The first output device 105 outputs to outside the predicted collapse time point determined by the slope collapse prediction device 104 as a prediction result of the slope collapse prediction system 100. The first output device 105 is, for example, a display or a loudspeaker used to report a prediction result, or a communication circuit used to transmit a prediction result to another device.

Description of Operation

Figure 12:
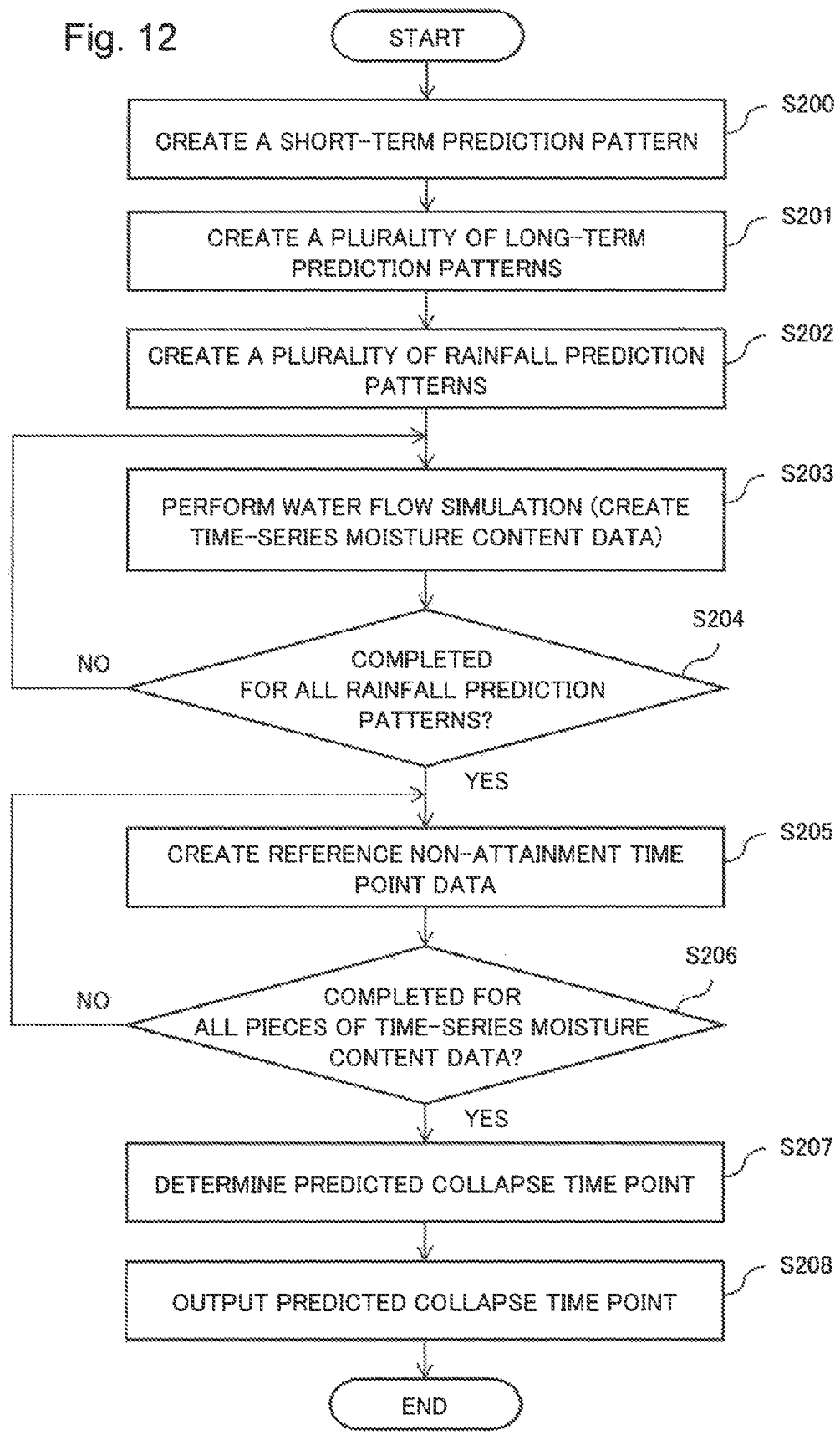
FIG. 12 is a flowchart illustrating an example operation of the slope collapse prediction system according to the third example embodiment.

FIG. 12 is a flowchart illustrating an example operation of the slope collapse prediction system 100 illustrated in FIG. 6.

The short-term prediction unit 1011 of the rainfall amount prediction device 101 performs a rainfall prediction for a short-term prediction period and creates a short-term prediction pattern (step S200).

The long-term prediction unit 1012 of the rainfall amount prediction device 101 performs a rainfall prediction for a long-term prediction period and obtains a long-term rainfall prediction result. The long-term prediction unit 1012 calculates a predicted total rainfall amount in the long-term prediction period by using the short-term prediction pattern and the long-term rainfall prediction result. The long-term prediction unit 1012 then creates a plurality of long-term prediction patterns in the long-term prediction period under the limitations of the predicted total rainfall amount that has been calculated (step S201).

The rainfall prediction pattern creation unit 1013 of the rainfall amount prediction device 101 creates a plurality of rainfall prediction patterns for the entirety of a prediction period by combining, on a time axis, the single short-term prediction pattern created by the short-term prediction unit 1011 and the plurality of long-term prediction patterns created by the long-term prediction unit 1012 (step S202).

The execution order of the process in step S200 and the process in step S201 is not limited to the order illustrated in FIG. 12. Both processes may be executed in reverse order or concurrently.

The water flow simulation unit 1021 of the simulation device 102 performs a water flow simulation by using a rainfall prediction pattern and creates time-series moisture content data of a mesh corresponding to a prediction target slope (step S203). The simulation device 102 determines whether a water flow simulation has been performed for all rainfall prediction patterns (step S204). When a water flow simulation has not been performed for all rainfall prediction patterns (NO determined in step S204), the simulation device 102 repeats the process in step S203. On the other hand, when a water flow simulation has been performed for all rainfall prediction patterns (YES determined in step S204), the process in step S205 is executed.

The slope safety factor calculation unit 1031 of the slope analysis device 103 inputs the time-series moisture content data created by the simulation device 102, creates time-series safety factor data for each piece of time-series moisture content data, and finally creates reference non-attainment time point data (step S205).

The slope analysis device 103 checks whether reference non-attainment time point data has been created for all pieces of time-series moisture content data (step S206). When reference non-attainment time point data has not been created for all pieces of time-series moisture content data (NO determined in step S206), the slope analysis device 103 executes the process in step S205. On the other hand, when reference non-attainment time point data has been created for all pieces of time-series moisture content data (YES determined in step S206), the process in step S207 is executed.

The slope collapse prediction device 104 checks all pieces of reference non-attainment time point data and determines, as a predicted collapse time point of a prediction target slope, a time point at which a slope safety factor is below a safety threshold earliest among all the pieces of data (step S207).

The first output device 105 outputs to outside the predicted collapse time point determined by the slope collapse prediction device 104 (step S208).

Description of Advantageous Effects

In the aforementioned third example embodiment, plural pieces of reference non-attainment time point data corresponding to a plurality of rainfall prediction patterns are created and an earliest time point among all the pieces of reference non-attainment time point data is determined as a predicted collapse time point. With this configuration of the slope collapse prediction system, even when a single rainfall prediction pattern is influenced by a disturbance, a reference non-attainment time point determined on the basis of any other rainfall prediction pattern not influenced by the disturbance is employed as a predicted collapse time point. In other words, the third example embodiment makes it possible to perform a slope collapse prediction with excellent robustness.

Further, in the third example embodiment, a long-term prediction pattern among the plurality of rainfall prediction patterns is created under the limitations of the predicted total rainfall amount in the long-term prediction period. In this example, generally speaking, it is considered that the reliability of a predicted total rainfall amount over a long time interval according to a long-term prediction model (for example, MSM or RSM) is relatively high. In other words, the accuracy of a slope collapse prediction for the entirety of a prediction period is maintained at a certain level.

Summarizing the above, the third example embodiment makes it possible to perform a slope collapse prediction with excellent robustness while maintaining the prediction accuracy for the entirety of a prediction period at a certain level.

Description of Variations

The aforementioned third example embodiment may be configured so that, as in the second example embodiment, the operation illustrated in FIG. 12 will be described as a program, which program will be stored in a computer-readable recording medium and executed by an arithmetic device such as a CPU.

In the third example embodiment, the rainfall amount prediction device 101 may be replaced with the rainfall amount prediction device 10 according to the first example embodiment or the rainfall amount prediction device 60 according to the second example embodiment.

Moreover, in the third example embodiment, a rainfall prediction result according to a long-term prediction model is used only for calculating a predicted total rainfall amount in a long-term prediction period and is not used as a plurality of long-term prediction patterns for a plurality of rainfall prediction patterns finally used for a slope collapse prediction. However, a rainfall prediction result itself according to a long-term prediction model may be used as one of a plurality of long-term prediction patterns. For example, a rainfall prediction result itself according to a long-term prediction model may be used as a long-term prediction pattern in addition to the first long-term prediction pattern (FIG. 9), the second long-term prediction pattern (FIG. 10), and the third long-term prediction pattern (FIG. 11), that is, total four long-term prediction patterns may be used. As a matter of course, any plural number of long-term prediction patterns (that is, any plural number of rainfall prediction patterns) may be used, and the number is not limited to three or four.

Fourth Example Embodiment

Description of Configuration

Figure 13:
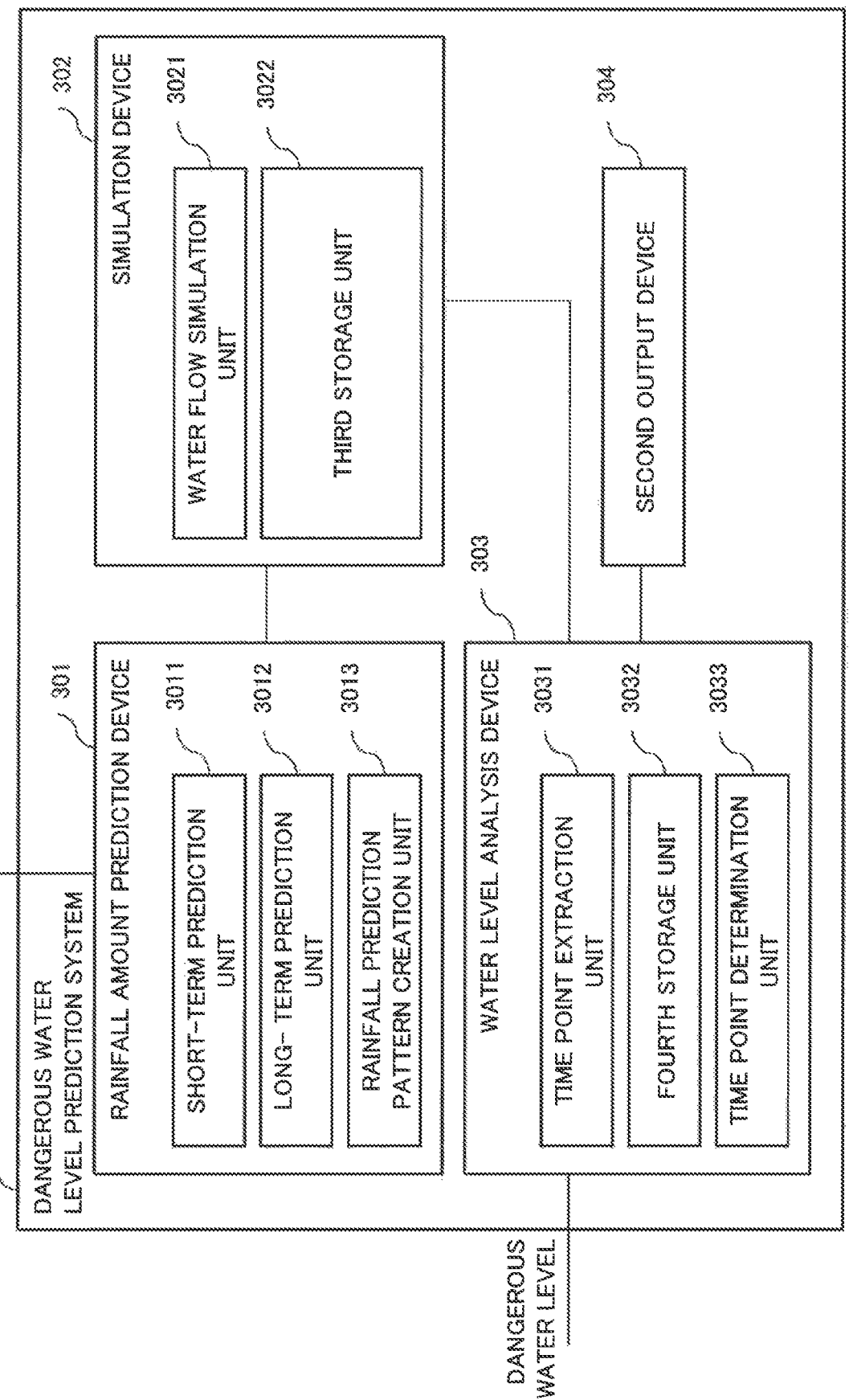
FIG. 13 is a block diagram of an example configuration of a dangerous water level prediction system according to a fourth example embodiment of the invention.

FIG. 13 is a block diagram of an example configuration of a dangerous water level prediction system 300 according to a fourth example embodiment of the invention.

The dangerous water level prediction system 300 is provided with a prediction period (for example, a period from a prediction start time point to a prediction end point) and a dangerous water level as a threshold of a water level that are specified by a person in charge of a dangerous water level prediction. The dangerous water level prediction system 300 outputs a predicted time point at which the water level of a prediction target river will reach a dangerous water level within a prediction period (a predicted reaching time point described later).

The dangerous water level prediction system 300 includes a rainfall amount prediction device 301, a simulation device 302, a water level analysis device 303, and a second output device 304.

The rainfall amount prediction device 301 includes a short-term prediction unit 3011, a long-term prediction 3012, and a rainfall prediction pattern creation unit 3013. The rainfall amount prediction device 301 creates a plurality of rainfall prediction patterns in a prediction period, by using a similar method to the rainfall amount prediction device 101 according to the third example embodiment.

The simulation device 302 includes a water flow simulation unit 3021 and a third storage unit 3022.

The water flow simulation unit 3021 predicts a water flow, that is, a water level, a runoff amount or the like, by performing a water flow simulation based on a predetermined physical model for a wide second region including a prediction target river, that is, an area as a target of water flow simulation in a dangerous water level prediction.

As mentioned above, a plurality of rainfall prediction patterns are created in the rainfall amount prediction device 301. Accordingly, the water flow simulation unit 3021 creates time-series water level data of a prediction target river, by performing a water flow simulation using all of the plurality of rainfall prediction patterns. The third storage unit 3022 stores the time-series water level data. In this process, as many pieces of time-series water level data as the number of rainfall prediction patterns are stored.

A concrete example of water flow simulation will be described. The water flow simulation unit 3021 performs a water flow simulation by using, for example, a water flow simulator composed of a combination of a model called a distributed runoff model and a kinematic wave channel model. This predicts a water flow in the second region.

The time-series water level data created in this process is time-series data of a water level at a predetermined specific point in a prediction target river from a prediction start time point to a prediction end time point.

The distributed runoff model used in this example is used to simulate a water flow except in a river in the second region by using as an input a rainfall prediction pattern for the second region. Specifically, the second region is divided into meshes of an appropriate size (50 m×50 m, 250 m×250 m, or the like) in the distributed runoff model and a water flow between meshes is determined in one direction by using a concept of a drainage line, based on gradient information representing the gradient of the second region. The soil moisture content of each mesh, runoff amount to a connected mesh, or the like is calculated by simulating a flow of water in a mesh on the basis of the rainfall prediction pattern.

The kinematic wave channel model simulates a water flow of a river in the second region by using as an input the rainfall prediction pattern for the second region. Specifically, a prediction target river is turned into a mathematical model by way of a partial differential equation on the basis of river channel width information or an input rainfall prediction pattern. Runoff amount or water level of a river channel is calculated by solving the partial differential equation by using a numerical calculation method.

As mentioned above, a plurality of rainfall prediction patterns are created in the rainfall amount prediction device 301. Accordingly, the water flow simulation unit 3021 performs a water flow simulation for each of the plurality of rainfall prediction patterns and creates time-series water level data of a prediction target river. A fourth storage unit 3032 stores the time-series water level data that has been created. In this process, as many pieces of time-series water level data as the number of rainfall prediction patterns are stored.

The following is a continuation of description of FIG. 13. The water level analysis device 303 includes a time point extraction unit 3031, the fourth storage unit 3032, and a time point determination unit 3033.

The time point extraction unit 3031 creates reaching time point data for each piece of time-series water level data by using a dangerous water level and all pieces of time-series water level data stored in the fourth storage unit 3032. Specifically, each piece of reaching time point data includes all time points (reaching time points) at which the water level of a prediction target river exceeds a dangerous water level among the plurality of time-series water level data. The fourth storage unit 3032 stores the reaching time point data.

Note that reaching time point data itself need not be created when the water level of a prediction target river does not exceed a dangerous water level a single time (that is, when the number of reaching time points is 0). Alternatively, reaching time point data may be created only with a status specified indicating "no reaching time points (No Data)".

The time point determination unit 3033 checks all pieces of reaching time point data stored in the fourth storage unit 3032 and determines, as a predicted reaching time point, a time point at which a dangerous water level is reached earliest among all the pieces of data. Note that a reaching time point need not be created when no reaching time points exist. When only a single reaching time point exists, the time point determination unit 3033 may determine the reaching time point as a predicted reaching time point.

The second output device 304 outputs to outside the predicted reaching time point determined by the time point determination unit 3033 as a prediction result of the dangerous water level prediction system 300.

Description of Operation

Figure 14:
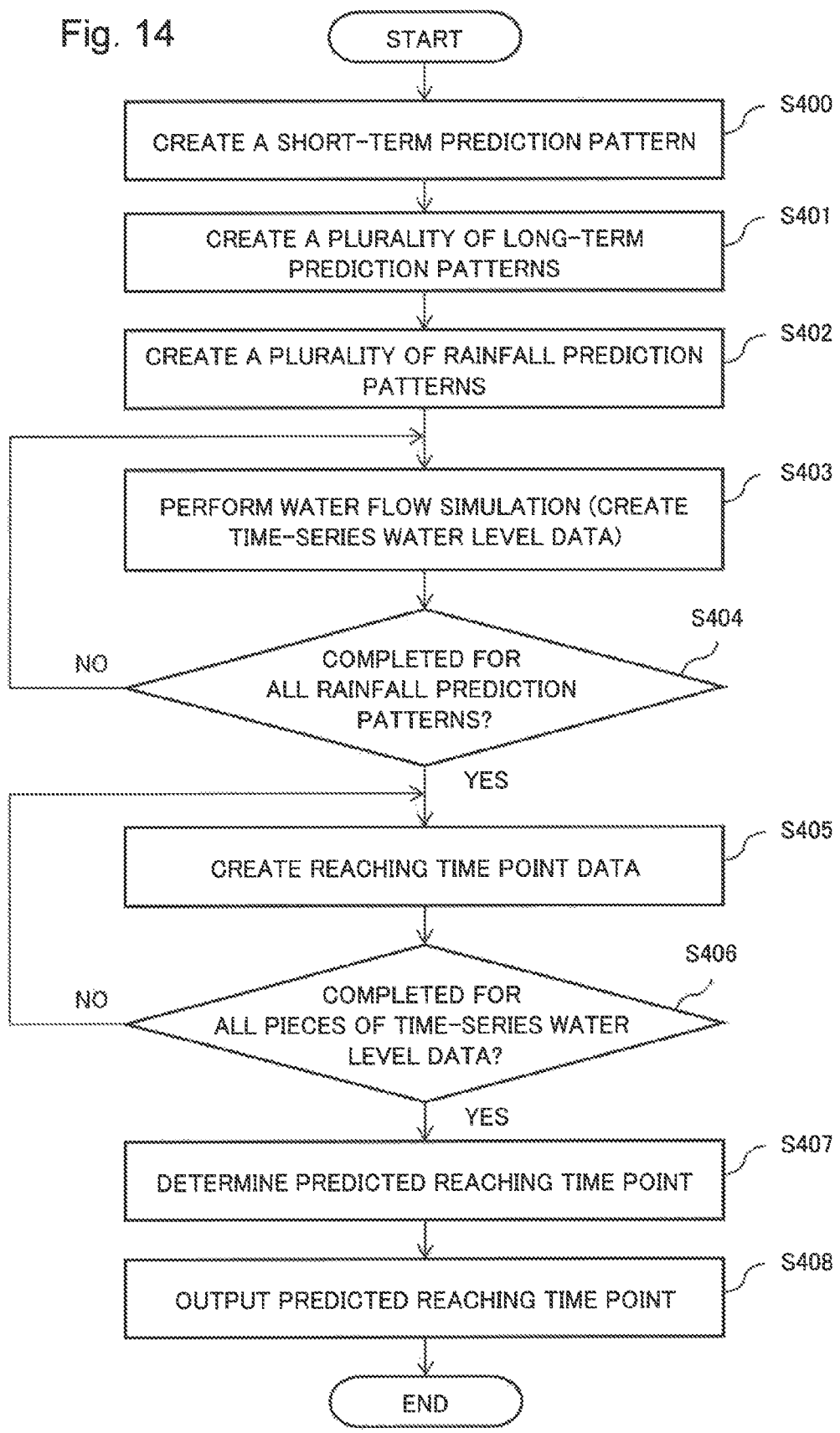
FIG. 14 is a flowchart illustrating an example operation of the dangerous water level prediction system according to the fourth example embodiment.

FIG. 14 is a flowchart illustrating an example operation of the dangerous water level prediction system 300 illustrated in FIG. 13.

The short-term prediction unit 3011 of the rainfall amount prediction device 301 performs a rainfall prediction for a short-term prediction period and creates a short-term prediction pattern (step S400).

The long-term prediction unit 3012 of the rainfall amount prediction device 301 performs a rainfall prediction for a long-term prediction period and obtains a long-term rainfall prediction result. The long-term prediction unit 3012 calculates a predicted total rainfall amount in the long-term prediction period by using the short-term prediction pattern and the long-term rainfall prediction result. The long-term prediction unit 1012 then creates a plurality of long-term prediction patterns in the long-term prediction period under the limitations of the predicted total rainfall amount that has been calculated (step S401).

The rainfall prediction pattern creation unit 3013 of the rainfall amount prediction device 301 creates a plurality of rainfall prediction patterns for the entirety of a prediction period by combining, on a time axis, the single short-term prediction pattern created by the short-term prediction unit 3011 and the plurality of long-term prediction patterns created by the long-term prediction unit 3012 (step S402).

The execution order of the process in step S400 and the process in step S401 is not limited to the order illustrated in FIG. 14. Both processes may be executed in reverse order or concurrently.

The water flow simulation unit 3021 of the simulation device 302 performs, for each rainfall prediction pattern, a water flow simulation in a second region and creates, for each rainfall prediction pattern, time-series water level data indicating a predicted water level at a specific point in a prediction target river (step S403).

The simulation device 302 determines whether a water flow simulation has been performed for all rainfall prediction patterns (step S404). When a water flow simulation has not been performed for all rainfall prediction patterns (NO determined in step S404), the simulation device 302 executes the process in step S403. On the other hand, when a water flow simulation has been performed for all rainfall prediction patterns (YES determined in step S404), the process in step S405 is executed.

The time point extraction unit 3031 of the water level analysis device 303 inputs each piece of time-series water level data created by the simulation device 302 and a dangerous water level and creates, based thereon, reaching time point data for each piece of time-series water level data (step S405).

The water level analysis device 303 checks whether reaching time point data has been created for all pieces of time-series water level data (step S406). When reaching time point data has not been created for all pieces of time-series water level data (NO determined in step S406), the water level analysis device 303 executes the process in step S405. On the other hand, when reaching time point data has been created for all pieces of time-series water level data (YES determined in step S406), the process in step S407 is executed.

The time point determination unit 3033 checks all the pieces of reaching time point data stored in the fourth storage unit 3032 and determines, as a predicted reaching time point, a time point at which a dangerous water level is reached earliest among all the pieces of data (step S407).

The second output device 304 outputs to outside the predicted reaching time point determined by the water level analysis device 303 (step S408).

Description of Advantageous Effects

In the aforementioned fourth example embodiment, plural pieces of reaching time point data corresponding to a plurality of rainfall prediction patterns are created and an earliest time point at which a dangerous water level is reached among all the pieces of reaching time point data is determined as a predicted reaching time point. With this configuration of the dangerous water level prediction system, even when a single rainfall prediction pattern is influenced by a disturbance, a reaching time point determined on the basis of any other rainfall prediction pattern not influenced by the disturbance is employed as a predicted reaching time point. In other words, the fourth example embodiment makes it possible to perform a dangerous water level prediction with excellent robustness.

Further, in the fourth example embodiment, a long-term prediction pattern among the plurality of rainfall prediction patterns is created under the limitations of the predicted total rainfall amount in the long-term prediction period. In this example, generally speaking, it is considered that the reliability of a predicted total rainfall amount over a long time interval according to a long-term prediction model (for example, MSM or RSM) is relatively high. In other words, the accuracy of a dangerous water level prediction for the entirety of a prediction period is maintained at a certain level.

Summarizing the above, the fourth example embodiment makes it possible to perform a dangerous water level prediction with excellent robustness while maintaining the prediction accuracy for the entirety of a prediction period at a certain level.

Description of Variations

The aforementioned fourth example embodiment may be configured so that, as in the second example embodiment, the operation illustrated in FIG. 14 will be described as a program, which program will be stored in a computer-readable recording medium and executed by an arithmetic device such as a CPU.

In the fourth example embodiment, the rainfall amount prediction device 301 may be replaced with the rainfall amount prediction device 10 according to the first example embodiment or the rainfall amount prediction device 60 according to the second example embodiment.

Note that applications of a rainfall amount prediction device described in the aforementioned first to fourth example embodiments are not limited to fields of disaster prediction such as a slope collapse prediction and a dangerous water level prediction but include a wide range of fields utilizing rainfall amount prediction. For example, a rainfall amount prediction device is applicable to management of agricultural water or determination of a time of harvest predicting a flood in the field of the agricultural Information and Communication Technology (ICT). Further, for example, a rainfall amount prediction device can be applied to management of a water volume in a dam or safe operation management of roads or railways.

While the invention has been described by using example embodiments, the technical scope of the invention is not limited to the description of the above example embodiments. It is readily understood by those skilled in the art that various changes or improvements may be made to the above example embodiments. Accordingly, it goes without saying that example embodiments encompassing such changes or improvements fall within the technical scope of the invention. A numerical value or name of a configuration used in the aforementioned example embodiments is exemplary and may be changed as appropriate.

The invention has been described by using the aforementioned example embodiments as model examples. However, the invention is not limited to the aforementioned example embodiments. In other words, various configurations that can be understood by those skilled in the art can be applied to the invention within the scope of the invention.

The present application claims priority based on Japanese patent application No. 2016-168793 filed on Aug. 31, 2016, the entire disclosure of which is incorporated herein.

REFERENCE SIGNS LIST

10 Rainfall amount prediction device
12 First prediction unit
14 Second prediction unit
16 Pattern creation unit
50A, 50B, 51A, 51B Rainfall prediction pattern
60 Rainfall amount prediction device
62 Storage unit
64 Control unit
70 Rainfall amount prediction program
100 Slope collapse prediction system
101 Rainfall amount prediction device
102 Simulation device
103 Slope analysis device
104 Slope collapse prediction device
105 First output device
300 Dangerous water level prediction system
301 Rainfall amount prediction device
302 Simulation device
302 Water level analysis device
304 Second output device
1011 Short-term prediction unit
1012 Long-term prediction unit
1013 Rainfall prediction pattern creation unit
1021 Water flow simulation unit
1022 First storage unit
1031 Slope safety factor calculation unit
1032 Second storage unit
3011 Short-term prediction unit
3012 Long-term prediction unit
3013 Rainfall prediction pattern creation unit
3021 Water flow simulation unit
3022 Third storage unit
3031 Time point extraction unit
3032 Fourth storage unit
3033 Time point determination unit

The invention claimed is:

1. A rainfall amount prediction device, comprising:
first prediction unit, in relation to a first period within a prediction period, performing a rainfall prediction according to a first prediction model capable of prediction at a first accuracy, creating a first prediction pattern, and calculating a first total rainfall amount that is the total rainfall amount in the first period according to the first prediction pattern;
second prediction unit, in relation to the entirety of the prediction period, performing a rainfall prediction according to a second prediction model capable of prediction at a second accuracy lower than the first accuracy, creating a prediction pattern, determining an entire total rainfall amount that is the total rainfall amount in the entirety of the prediction period according to the prediction pattern, determining a second total rainfall amount that is the total rainfall amount in a second period that is a period in the prediction period other than the first period by subtracting the first total rainfall amount from the entire total rainfall amount, and creating, under the limitations of the second total rainfall amount, a plurality of second prediction patterns that are prediction patterns for the second period and that involve different patterns of rainfall; and
pattern creation unit creating a plurality of rainfall prediction patterns for the entirety of the prediction period by combining, on a time axis, the first prediction pattern and the plurality of second prediction patterns,
wherein the limitations keep constant the second total rainfall amount, and
wherein the second prediction unit creates:
an early-stage-concentrated pattern in which the total rainfall amount in the second period is the second total rainfall amount and rainfall is concentrated on the early stage of the second period;
a middle-stage-concentrated pattern in which the total rainfall amount in the second period is the second total rainfall amount and rainfall is concentrated on the middle stage of the second period; and
a late-stage-concentrated pattern in which the total rainfall amount in the second period is the second total rainfall amount and rainfall is concentrated on the late stage of the second period.

2. A rainfall amount prediction method, comprising:
in relation to a first period within a prediction period, performing a rainfall prediction according to a first prediction model capable of prediction at a first accuracy, creating a first prediction pattern, and calculating a first total rainfall amount that is the total rainfall amount in the first period according to the first prediction pattern;
in relation to the entirety of the prediction period, performing a rainfall prediction according to a second prediction model capable of prediction at a second accuracy lower than the first accuracy, creating a prediction pattern, determining an entire total rainfall amount that is the total rainfall amount in the entirety of the prediction period according to the prediction pattern, determining a second total rainfall amount that is the total rainfall amount in a second period that is a period in the prediction period other than the first period by subtracting the first total rainfall amount from the entire total rainfall amount, and creating, under the limitations of the second total rainfall amount, a plurality of second prediction patterns that are prediction patterns for the second period and that involve different patterns of rainfall; and
creating a plurality of rainfall prediction patterns for the entirety of the prediction period by combining, on a time axis, the first prediction pattern and the plurality of second prediction patterns,
wherein the limitations keep constant the second total rainfall amount, and
wherein the plurality of second prediction patterns are comprised an early-stage-concentrated pattern in which the total rainfall amount in the second period is the second total rainfall amount and rainfall is concentrated on the early stage of the second period, a middle-stage-concentrated pattern in which the total rainfall amount in the second period is the second total rainfall amount and rainfall is concentrated on the middle stage of the second period, and a late-stage-concentrated pattern in which the total rainfall amount in the second period is the second total rainfall amount and rainfall is concentrated on the late stage of the second period.

3. A recording medium for storing a rainfall amount prediction program used to cause a computer to execute:

a first prediction process to, in relation to a first period within a prediction period, perform a rainfall prediction according to a first prediction model capable of prediction at a first accuracy, create a first prediction pattern, and calculate a first total rainfall amount that is the total rainfall amount in the first period according to the first prediction pattern;

a second prediction process to, in relation to the entirety of the prediction period, perform a rainfall prediction according to a second prediction model capable of prediction at a second accuracy lower than the first accuracy, create a prediction pattern, determine an entire total rainfall amount that is the total rainfall amount in the entirety of the prediction period according to the prediction pattern, determine a second total rainfall amount that is the total rainfall amount in a second period that is a period in the prediction period other than the first period by subtracting the first total rainfall amount from the entire total rainfall amount, and create, under the limitations of the second total rainfall amount, a plurality of second prediction patterns that are prediction patterns for the second period and that involve different patterns of rainfall; and a pattern creation process to create a plurality of rainfall prediction patterns for the entirety of the prediction period by combining, on a time axis, the first prediction pattern and the plurality of second prediction patterns, wherein the limitations keep constant the second total rainfall amount, and wherein the plurality of second prediction patterns are comprised an early-stage-concentrated pattern in which the total rainfall amount in the second period is the second total rainfall amount and rainfall is concentrated on the early stage of the second period, a middle-stage-concentrated pattern in which the total rainfall amount in the second period is the second total rainfall amount and rainfall is concentrated on the middle stage of the second period, and a late-stage-concentrated pattern in which the total rainfall amount in the second period is the second total rainfall amount and rainfall is concentrated on the late stage of the second period.

4. A slope collapse prediction system, comprising:

the rainfall amount prediction device according to claim 1;

a simulation device for creating, in relation to a predetermined first region including a prediction target slope, time-series moisture content data indicating, in time series, a prediction result of a soil moisture content for each of the rainfall prediction patterns by performing a water flow simulation for each of the rainfall prediction patterns;

a slope analysis device for creating, for each piece of the time-series moisture content data, time-series safety factor data indicating, in time series, a slope safety factor that is an index indicating the safety of the prediction target slope, extracting, for each piece of the time-series safety factor data, at least one reference non-attainment time point at which the slope safety factor is below a predetermined safety threshold, and creating reference non-attainment time point data including all the reference non-attainment time points that have been extracted; and a slope collapse prediction device for checking all the reference non-attainment time point data and determining, as a predicted collapse time point of the prediction target slope, a time point at which the slope safety factor is below the safety threshold earliest among all the reference non-attainment time point data.

5. The slope collapse prediction system according to claim 4, further comprising a first output device for outputting to outside the predicted collapse time point.

6. A dangerous water level prediction system, comprising:

the rainfall amount prediction device according to claim 1;

a simulation device for creating, in relation to a predetermined second region including a prediction target river, time-series water level data indicating, in time series, a predicted water level of the prediction target river for each of the rainfall prediction patterns by performing a water flow simulation for each of the rainfall prediction patterns; and a water level analysis device for extracting, for each piece of the time-series water level data, at least one reaching time point at which the predicted water level reaches a predetermined dangerous water level, creating reaching time point data including all the reaching time points that have been extracted, checking all the reaching point data, and determining, as a predicted time point of the prediction target river, a time point at which the dangerous water level is reached earliest among all the reaching time point data.

7. The dangerous water level prediction system according to claim 6, further comprising a second output device for outputting to outside the predicted reaching time point.

* * * * *